United States Patent
Hong

(10) Patent No.: US 12,484,020 B2
(45) Date of Patent: Nov. 25, 2025

(54) METHOD FOR INDICATING PAGING CAUSE, AND METHOD FOR REQUESTING PAGING CAUSE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 377 days.

(21) Appl. No.: 18/028,140

(22) PCT Filed: Sep. 28, 2020

(86) PCT No.: PCT/CN2020/118575
§ 371 (c)(1),
(2) Date: Mar. 23, 2023

(87) PCT Pub. No.: WO2022/061932
PCT Pub. Date: Mar. 31, 2022

(65) Prior Publication Data
US 2023/0371001 A1    Nov. 16, 2023

(51) Int. Cl.
*H04W 68/02* (2009.01)
*H04W 88/06* (2009.01)

(52) U.S. Cl.
CPC .................. *H04W 68/02* (2013.01)

(58) Field of Classification Search
CPC ..................................... H04W 68/02
(Continued)

(56) References Cited

U.S. PATENT DOCUMENTS

2001/0004595 A1* 6/2001 Dent ............... H04W 68/08
455/435.2
2015/0080034 A1* 3/2015 Xi .................... H04W 68/06
455/458

(Continued)

FOREIGN PATENT DOCUMENTS

CN     101203005 A    6/2008
CN     102835162 A    12/2012
(Continued)

OTHER PUBLICATIONS

European Patent Application No. 20954779.3 Search Report dated Apr. 10, 2024, 14 pages.
(Continued)

*Primary Examiner* — Mark G. Pannell
(74) *Attorney, Agent, or Firm* — Cozen O'Connor

(57) ABSTRACT

A method for indicating a paging cause, performed by a core network device, includes receiving request information sent by a terminal, wherein the request information requests the core network device to send a paging cause for a paging signaling to at least one base station; and sending the paging cause to the at least one base station. The terminal may be configured with at least first and second SIM cards. A method for requesting a paging cause, performed by a terminal, includes: sending request information to a core network device, wherein the request information comprises information of at least one base station, and the request information requests the core network device to send a paging cause for a paging signaling to the at least one base station.

19 Claims, 12 Drawing Sheets

(58) Field of Classification Search
USPC .......................................................... 370/329
See application file for complete search history.

(56) References Cited

U.S. PATENT DOCUMENTS

2020/0022104 A1* 1/2020 Geng ..................... H04W 8/18
2021/0352619 A1* 11/2021 Ryu .................... H04W 68/005

FOREIGN PATENT DOCUMENTS

| CN | 110313201 A | 10/2019 |
| CN | 111278106 A | 6/2020 |
| CN | 112166634 A | 1/2021 |
| WO | WO 2020185949 A2 | 9/2020 |

OTHER PUBLICATIONS

Intel et al., "KI #1,Sol #1—Solution update to address Ens", SA WG2 Meeting SA2-140e, S2-2006016, Aug. 2020, 8 pages.
Vivo, "KI #1, Sol #1: update the handling of paging cause", SA WG2 Meeting #140E (e-meeting), S2-2004993, Aug. 2020, 6 pages.
3rd Generation Partnership Project, "Technical Specification Group Services and System Aspects; Study on system enablers for devices having multiple Universal Subscriber Identity Modules (USIM) (Release 17)" 3GPP TR 23.761, V1.0.0 Sep. 2020, 104 pages.
Chinese Patent Application No. 202080002463.5 Office Action dated Sep. 4, 2023, 7 pages.
Chinese Patent Application No. 202080002463.5 English translation of Office Action dated Sep. 4, 2023, 5 pages.
Chinese Patent Application No. 202080002463.5 Office Action dated Feb. 24, 2024, 8 pages.
Chinese Patent Application No. 202080002463.5 English translation of Office Action dated Feb. 24, 2024, 5 pages.
PCT/CN2020/118575 English translation of Search Report dated Jun. 18, 2021, 3 pages.
Mediatek, Inc. "Support for Multi-SIM Devices" 3GPP TSG-RAN WG2, Meeting #111 electronic, R2-2007191, Aug. 2020, 6 pages.
Vivo "Initial Considerations for Multi-SIM" 3GPP TSG-RAN WG2, Meeting #111 e, R2-2007164, Aug. 2020, 8 pages.

* cited by examiner

METHOD FOR INDICATING PAGING CAUSE, AND METHOD FOR REQUESTING PAGING CAUSE

CROSS REFERENCE TO RELATED APPLICATIONS

This application is a national phase application based on International Application No. PCT/CN2020/118575, filed Sep. 28, 2020, the entire content of which is incorporated by reference for all purposes.

TECHNICAL FIELD

The disclosure relates to the field of communication technologies, in particular to a method for indicating a paging cause, a method for requesting a paging cause, and an electronic device.

BACKGROUND

In a mobile communication network, a core network device may determine a location of a terminal device based on a tracking area (TA), and interact with the terminal device via a base station in the TA.

SUMMARY

According to a first aspect of an embodiment of the present disclosure, a method for indicating a paging cause, performed by a core network device, is provided. The method includes:
  receiving request information sent by a terminal, in which, the request information requests the core network device to send a paging cause for a paging signaling to at least one base station; and
  sending the paging cause to the at least one base station.

According to a second aspect of an embodiment of the present disclosure, a method for requesting a paging cause, performed by a terminal, is provided. The method includes:
  sending request information to a core network device, in which the request information includes information of at least one base station, and the request information requests the core network device to send a paging cause for a paging signaling to the at least one base station.

According to a third aspect of an embodiment of the present disclosure, an electronic device is provided. The electronic device includes:
  a processor;
  a memory for storing instructions executable by the processor; in which
  the processor is configured to implement: receiving request information sent by a terminal, in which, the request information requests the core network device to send a paging cause for a paging signaling to at least one base station; and sending the paging cause to the at least one base station.

BRIEF DESCRIPTION OF THE DRAWINGS

In order to clearly illustrate the technical solution of embodiments of the present disclosure, a brief description of drawings used in the embodiments is given below. Obviously, the drawings in the following descriptions are only part of the embodiments of the present disclosure, and for those skilled in the art, other drawings can be obtained according to these drawings without inventive works.

DETAILED DESCRIPTION

The technical solutions in the embodiments of the disclosure will be clearly and completely described below in combination with the accompanying drawings in the embodiments of the disclosure. Obviously, the embodiments described are only a part of the embodiments of the disclosure, and not all of the embodiments. Based on the embodiments in the disclosure, all other embodiments obtained by those skilled in the art without inventive works fall within the scope of protection of the disclosure.

Generally, a core network device may send a paging signaling and a paging cause to all base stations in the TA when sending the paging signaling to the terminal device, which causes waste of the signaling to a certain extent.

Figure 1:
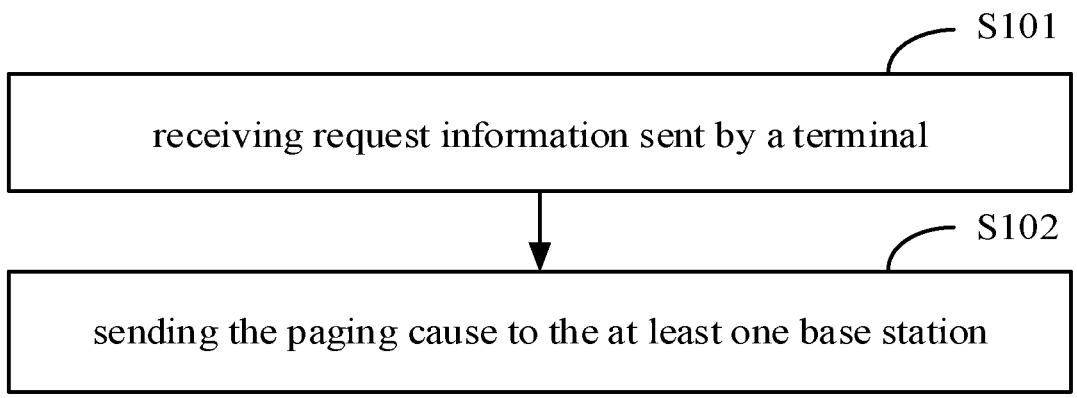
FIG. 1 is a flowchart of a method for indicating a paging cause according to an embodiment of the present disclosure.

FIG. 1 is a flowchart of a method for indicating a paging cause according to an embodiment of the present disclosure. The method as shown in this embodiment may be performed by a core network device. The core network device may include, but is not limited to, a 4G (generation) core network device, a 5G core network device, and a 6G core network device. The core network device may communicate with a terminal as a user equipment. The terminal may include, but is not limited to, electronic devices such as a cell phone, a tablet computer, a wearable device, a sensor, and an Internet of Things (IoT) device. In an embodiment, the terminal may be a terminal to which the method for requesting the paging cause described in any of subsequent embodiments is applied.

As shown in FIG. 1, the method may include the following steps.

At step S101, request information sent by a terminal is received.

The request information requests the core network device to send a paging cause for a paging signaling to at least one base station.

At step S102, the paging cause is sent to the at least one base station.

In an embodiment, the terminal may send the request information to the core network device for requesting to the core network device the paging cause for paging signaling. The request information may include information of the at least one base station for instructing the core network device to send the request information to the at least one base station. For example, the request information may include information of more than one base station for instructing the core network device to send the request information to at least one of the more than one base station.

In an embodiment, the core network device may send the paging cause to the at least one base station after receiving the request information sent by the terminal.

In the related art, the core network device sends a paging signaling and a paging cause to all base stations in a TA when paging a terminal in the TA, for example, the paging cause may be carried in the paging signaling. The base stations then broadcast the paging signaling and the paging cause, so that the terminal in the TA receives the paging signaling and the paging cause. The terminal may determine a type of the paging signaling based on the paging cause, and perform an operation based on the type of the paging signaling, such as an operation for resolving a communication conflict.

However, for a single-card terminal, since the terminal is provided with only one Subscriber Identity Module (SIM) card therein, there is generally no communication conflict, thus it is not necessary to resolve the communication conflict by determining the type of the paging signaling according to the paging cause.

Alternatively, for a multi-card terminal, although the terminal is provided with more than one SIM card and a communication conflict may occur among the more than one SIM card, thus it is not necessary to resolve the communication conflict by determining the type of the paging signaling according to the paging cause in a case that the multi-card terminal can resolve the communication conflict by itself.

It can be seen that at least in the above two cases, the terminal in the TA is not required to obtain the paging cause for the paging signaling, and then the base station in the TA is not required to send the paging cause to the terminal. Therefore, waste of the signaling may be caused in case of sending the paging cause to all base stations in the TA by the core network device.

According to an embodiment shown in FIG. 1, after receiving the request information sent by the terminal, the core network device may determine the at least one base station based on the information of the at least one base station in the request information, and send the paging cause to the base station.

Therefore, after receiving the request information sent by the terminal, the core network may send the paging cause to the base station based in the at least one base station indicated by the request information. On the one hand, the core network device may send the paging cause to the base station after receiving the request information, rather than sending the paging cause to the base station when sending the paging signaling to the base station, therefore, it is not required to send the paging cause along with the paging signal. On the other hand, the core network device only sends the paging cause to at least one of the base stations indicated by the request information based on the request information, instead of sending the paging cause to all base stations in the TA. Therefore, the present disclosure may avoid sending the paging cause unnecessarily by the core network device and avoid waste of the signaling.

In an embodiment, the base station may initiatively send the paging cause to the terminal after receiving the paging cause, or may send the paging cause to the terminal after receiving indication information sent by the core network device based on the embodiment shown in FIG. 2 below.

Figure 2:
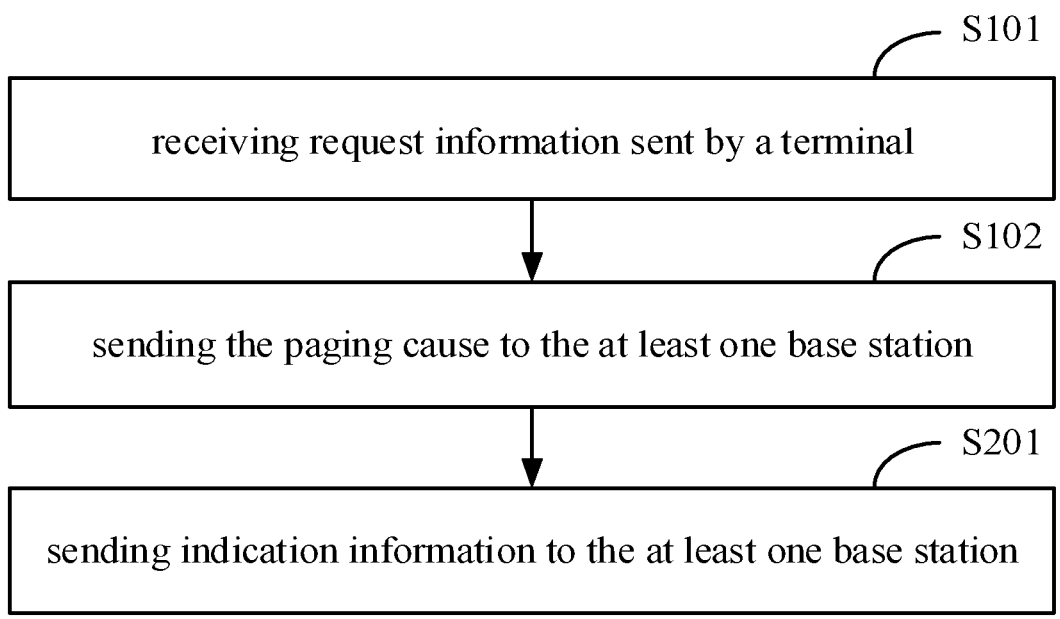
FIG. 2 is a flowchart of another method for indicating a paging cause according to an embodiment of the present disclosure.

FIG. 2 is a flowchart of another method for indicating a paging cause according to an embodiment of the disclosure.

As shown in FIG. 2, the method may further include the following step.

At step S201, indication information is sent to the at least one base station.

The indication information indicates the at least one base station to send the paging cause to the terminal.

In an embodiment, the core network device not only sends the paging cause to the at least one base stations determined, but also sends the indication information to the base station for instructing the base station to send the paging cause to the terminal. Optionally, the indication information may include identity information of a terminal, and the base station may then send the paging cause to the terminal corresponding to the identity information.

In an embodiment, the core network device may send the paging cause and the indication information to the base station via a same signaling. For example, the core network device may send the paging signaling to the base station, and the paging signaling carries the paging cause and the indication information. Alternatively, the core network device may send the paging cause and the indication information separately via different signalings. This embodiment is an illustrative description, and in practical applications, relevant information can be sent according to actual demands, which will not be repeated here.

In an embodiment, the at least one base station includes a first base station for sending the paging signaling to the terminal, and the request information includes information of the first base station.

The terminal receives the paging signaling sent by the core network device via the first base station, and may obtain the information of the first base station, and the request information sent to the core network device carries the information of the first base station. Therefore, the core network device may send the paging cause to the first base station after receiving the request information.

Figure 3:
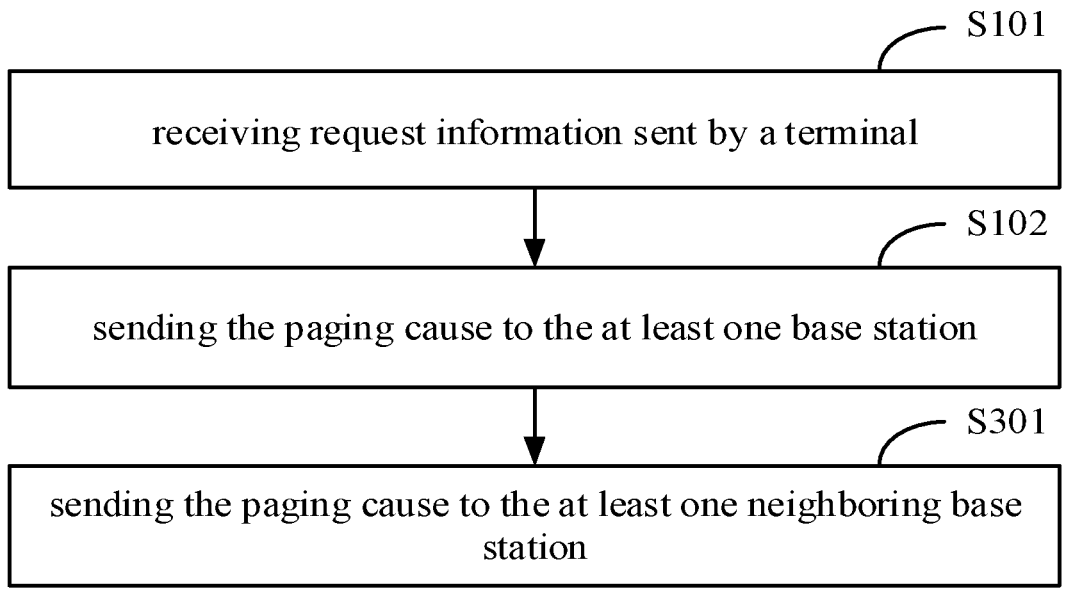
FIG. 3 is a flowchart of another method for indicating a paging cause according to an embodiment of the present disclosure.

FIG. 3 is a flowchart of another method for indicating a paging cause according to an embodiment of the present disclosure.

As shown in FIG. 3, in an embodiment, the request information further includes information of at least one neighboring base station of the first base station, and the method further includes the following step.

At step S301, the paging cause is sent to the at least one neighboring base station.

In an embodiment, the terminal may firstly determine the information of the at least one neighboring base station of the first base station. For example, the terminal may determine neighboring base stations by receiving signals broadcasted by the neighboring base stations, the information of the neighboring base stations may include, but is not limited to, identifiers of the neighboring base stations, and then send the information of the neighboring base stations to the core network device, for example, sends the information of the neighboring base stations carried in the request information to the core network device. Upon receiving the information of the neighboring base stations, the core network device may determine the neighboring base stations of the first base station and then send the paging cause to the at least one neighboring base station.

Accordingly, the neighboring base station may send the paging cause to the terminal, to ensure that the terminal is capable of receiving the paging cause sent by the neighboring base station when moving to a coverage area of the neighboring base station.

When the request information includes information of one neighboring base station, the core network device sends the paging cause to the neighboring base station. When the request information includes information of more than one neighboring base station, the core network device may determine one or more neighboring base stations from the more than one neighboring base station and send the paging cause to the one or more neighboring base stations determined.

In an embodiment, determining by the terminal the information of the at least one neighboring base station of the first base station includes: determining the information of the at least one neighboring base station with signal strength greater than a strength threshold from neighboring base stations of the first base station.

Firstly, the terminal may determine the strength threshold based on configuration information sent by the core network device or the base station.

For example, the terminal may receive the strength threshold sent by the core network device via a non-access stratum (NAS) signaling. For example, the terminal may receive a registration accept signaling carrying the strength threshold which is sent by the core network device when registering. Alternatively, the terminal may receive the strength threshold issued by the base station via a radio resource control (RRC) signaling. For example, the terminal may receive a broadcast signaling or a unicast signaling carrying the strength threshold which is sent by the base station.

It should be noted that the base station that sends the strength threshold to the terminal may be a first base station or other base stations, which is not limited in this embodiment.

Then, the terminal may receive signals from the neighboring base stations of the first base station and determine a signal strength of each neighboring base station. The terminal compares the signal strength of each neighboring base station with the strength threshold. In response to the signal strength being greater than the strength threshold, the terminal makes the request information carry information of a neighboring base station corresponding to the signal strength. In response to the signal strength being less than or equal to the strength threshold, the terminal may make the request information not carry the information of the neighboring base station corresponding to the signal strength.

It is noted that the method of determining the neighboring base station by the terminal based on the strength threshold in this embodiment is only an illustrative description, and in practical applications, the terminal may also determine the at least one neighboring base station by means of other methods, which are not limited in this embodiment.

It should be noted that, in this embodiment, an order in which the core network device sends the paging cause to the first base station and the neighboring base station may be set according to an actual situation. For example, as shown in FIG. 3, the core network device may send the paging cause the first base station first and then to the neighboring base station. Alternatively, the core network device may also send the paging cause to the neighboring base station first and then to the first base station. Alternatively, the core network device may send the paging cause to the neighboring base station and the first base station at the same time, which is not limited in the embodiment.

In an embodiment, the neighboring base station may initiatively send the paging cause to the terminal after receiving the paging cause, or may send the paging cause to the terminal after receiving the indication information sent by the core network device based on the embodiment shown in FIG. 4 below.

Figure 4:
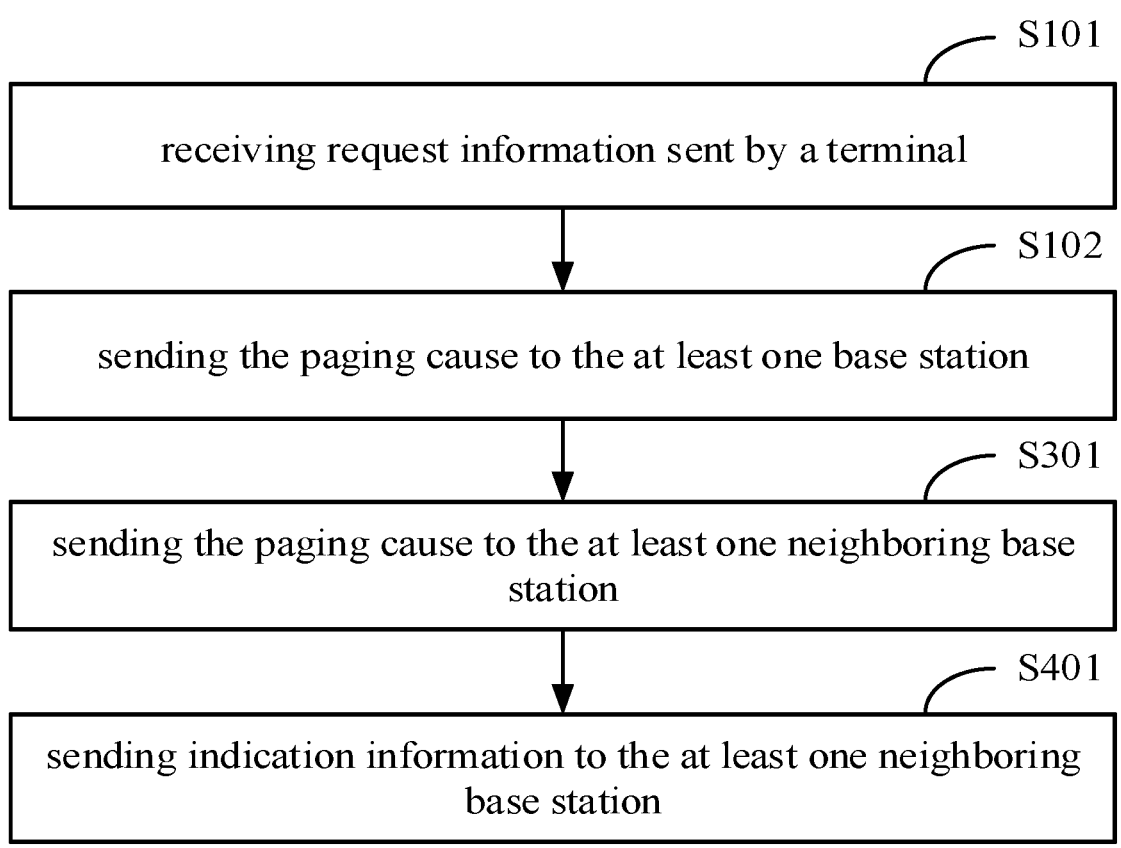
FIG. 4 is a flowchart of another method for indicating a paging cause according to an embodiment of the present disclosure.

FIG. 4 is a flowchart of another method for indicating a paging cause according to an embodiment of the disclosure.

As shown in FIG. 4, the method further includes the following step.

At step S401, indication information is sent to the at least one base station.

The indication information indicates the at least one base station to send the paging cause to the terminal.

In an embodiment, the core network device, after determining the at least one neighboring base station, not only sends the paging cause to the neighboring base station, but also sends the indication information to the neighboring base station for instructing the neighboring base station to send the paging cause to the terminal. Optionally, the indication information may include identity information of the terminal, and the neighboring base station may send the paging cause to the terminal corresponding to the identity information.

In an embodiment, the core network device may send both the paging cause and the indication information to the neighboring base station simultaneously via a same signaling. For example, the core network device may send the paging signaling to the neighboring base station and the paging signaling may carry the paging cause and the indication information. Alternatively, the core network device may send the paging cause and the indication information separately via different signalings. This embodiment is an illustrative description, and in practical applications, relevant information may be sent according to actual demands, which will not be repeated here.

In an embodiment, the core network device may determine the at least one neighboring base station and send the paging cause to the determined neighboring base station by various methods. Two specific embodiments are described below in combination with FIG. 5 and FIG. 6.

Figure 5:
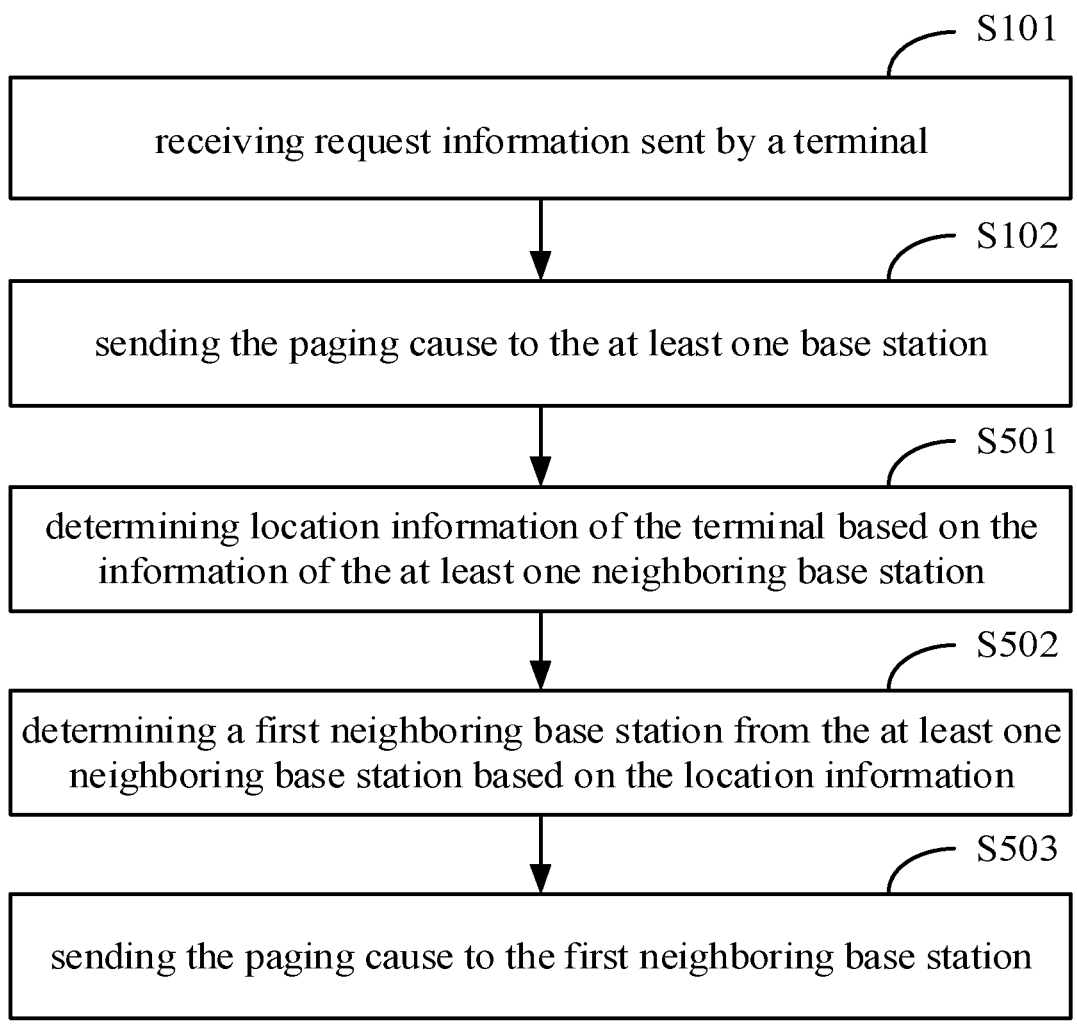
FIG. 5 is a flowchart present of another method for indicating a paging cause according to an embodiment of the disclosure.

FIG. 5 is a flowchart of another method for indicating a paging cause according to an embodiment of the disclosure.

As shown in FIG. 5, sending the paging cause to the at least one neighboring base station includes the following steps.

At step S501, location information of the terminal is determined based on the information of the at least one neighboring base station.

In an embodiment, the information of the neighboring base station may include, but is not limited to, location information, identity information, and a signal strength of the neighboring base station.

Firstly, the core network device may determine the location information of the neighboring base station based on the information of the neighboring base station. For example, the information of the neighboring base station reported by the terminal may include the location information of the neighboring base station, and thus the core network device may directly parse the information of the neighboring base station to determine the location information of the neighboring base station. Alternatively, the information of the neighboring base station reported by the terminal may include the identity information of the neighboring base station, and the core network device may query the location information of the neighboring base station corresponding to the identity information based on the identity information.

The core network device may determine the location information of the terminal based on the location information of each neighboring base station. For example, after determining the location information of the neighboring base station, the core network device may estimate the location where the terminal is located at in combination with the signal strength of the neighboring base station.

At step S502, a first neighboring base station is determined from the at least one neighboring base station based on the location information of the terminal.

In an embodiment, the core network device, after determining the location information of the terminal, may determine the first neighboring base station by selecting from the at least one neighboring base station carried by the request information. There may be one or more first neighboring base stations, which is not limited in the embodiment.

For example, the core network device may select multiple neighboring base stations closest to a range where the terminal is located as the first neighboring base stations.

For example, the information of the at least one neighboring base station in the request information includes respective identifiers of four neighboring base stations A, B, C, and D and a signal strength of each of these four neighboring base stations. For example, a signal strength of neighboring base station A is 2k, a signal strength of neighboring base station B is k, a signal strength of neighboring base station C is k, and a signal strength of neighboring base station D is k. The core network device may preliminarily estimate that the terminal is located at a distance of p/k to the neighboring base station B, the neighboring base station C, and the neighboring base station D, and a distance of p/2k to the neighboring base station A, in which p is a constant determined by the core network device as required.

Accordingly, the core network device may determine that the terminal is closest to the neighboring base station A, and then determine the neighboring base station A as the first neighboring base station. Thus, the core network device may send the paging cause to the neighboring base station A, to ensure that the terminal receives the paging cause sent by the neighboring base station A with a high signal strength.

The above way is to determine the neighboring base station closest to the terminal as the first neighboring base station, and the way of determining the first neighboring base station is not limited to the above way and can be set according to actual demands. For example, the core network device may determine a movement direction of the terminal based on the location information of the terminal, and then determine a neighboring base station located in the movement direction of the terminal from the at least one neighboring base station as the first neighboring base station.

At step S503, the paging cause is sent to the first neighboring base station.

In an embodiment, the core network device, after determining the first neighboring base station, may send the paging cause to the determined neighboring base station. Optionally, the core network device may also send the indication information to the first neighboring base station for instructing the first neighboring base station to send the paging cause to the terminal.

Figure 6:
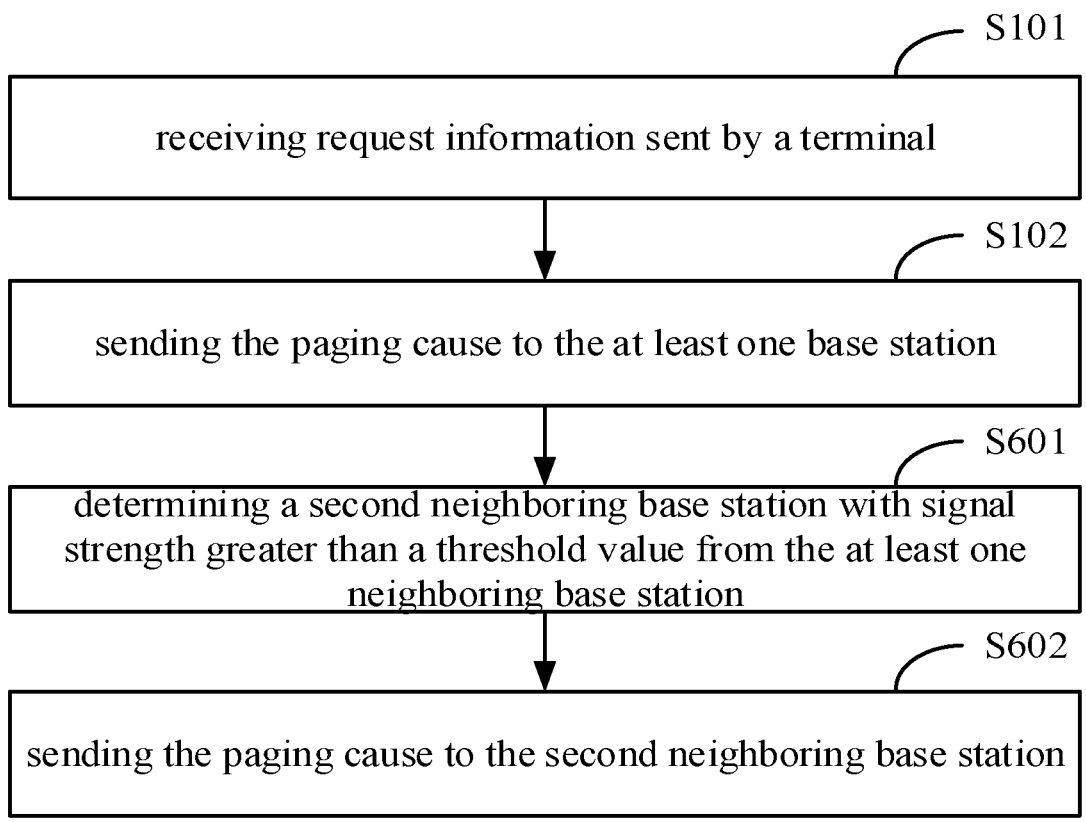
FIG. 6 is a flowchart of another method for indicating a paging cause according to an embodiment of the present disclosure.

FIG. 6 is a flowchart of another method for indicating a paging cause according to an embodiment of the disclosure.

As shown in FIG. 6, sending the paging cause to the at least one neighboring base station includes the following steps.

At step S601, a second neighboring base station with signal strength greater than a threshold value is determined from the at least one neighboring base station.

In an embodiment, the core network device may determine the neighboring base station based on a signal strength of communication with the terminal. For example, the information of the neighboring base station reported by the terminal may also include the signal strength of communication with each neighboring base station. On the basis, the core network device may compare the signal strength of each neighboring base station with a preset threshold and determine the neighboring base station with signal strength greater than the preset threshold as the second neighboring base station.

At step S602, the paging cause is sent to the second neighboring base station.

In an embodiment, the core network device, after determining the second neighboring base station, may send the paging cause to the determined neighboring base station The second neighboring base station has the large signal strength, which is beneficial to ensure a success rate of receiving by the terminal the paging cause sent from the second neighboring base station.

Optionally, the core network device may also send the indication information to the second neighboring base station to instruct the second neighboring base station to send the paging cause to the terminal.

The description of "the core network determining the at least one neighboring base station" is completed. It should be noted that this embodiment is only an illustrative description and is not limited.

Figure 7:
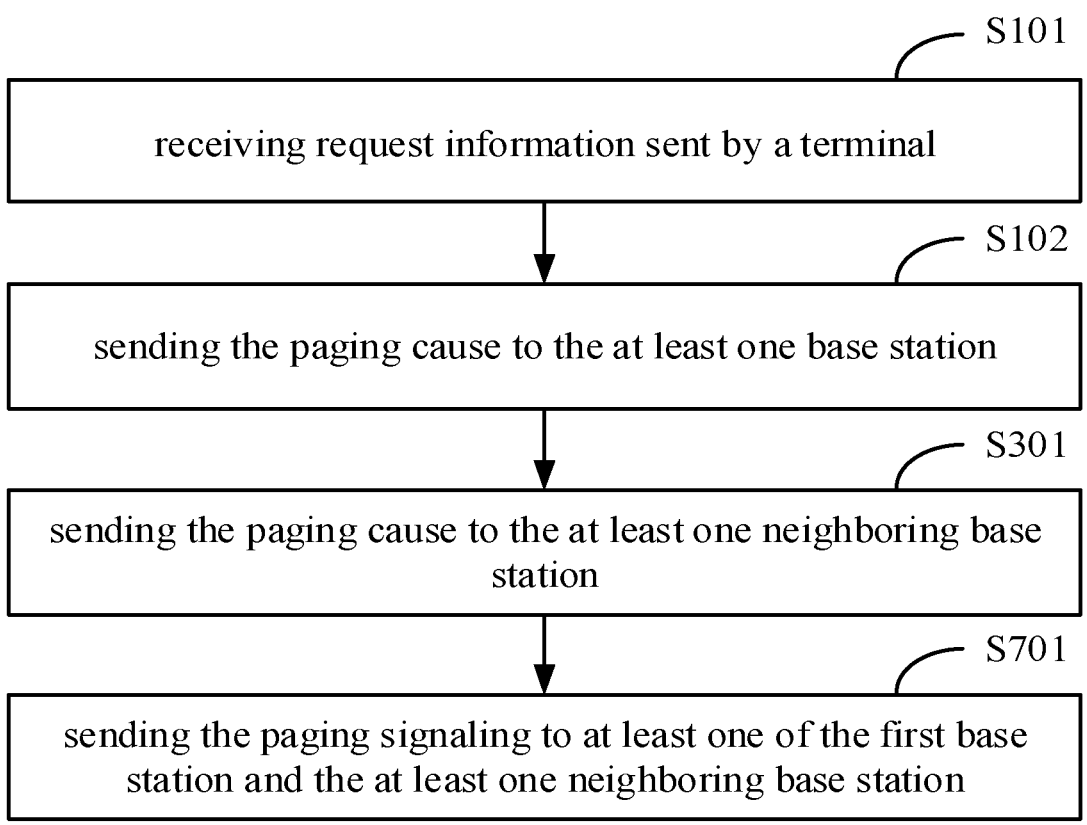
FIG. 7 is a flowchart of another method for indicating a paging cause according to an embodiment of the present disclosure.

FIG. 7 is a flowchart of another method for indicating a paging cause according to an embodiment of the disclosure. As shown in FIG. 7, the method further includes the following step.

At step S701, the paging signaling is sent to at least one of the first base station and the at least one neighboring base station.

In an embodiment, the paging signaling may be the paging signaling sent by the core network device to the terminal before receiving the request information sent by the terminal, and the paging cause may not be carried in the paging signaling sent to the terminal. Therefore, the terminal, after receiving the paging signaling, sends the paging cause for requesting a paging signaling to the core network device.

In an embodiment, the paging signaling may be the paging signaling sent by the core network device when sending the paging cause. For example, the core network device may send the paging signaling and carry the paging cause in the paging signaling. Optionally, the core network device may send the paging signaling to at least one of the first base station and the at least one neighboring base station.

For example, the at least one neighboring base station of the first base station may include one neighboring base station, the core network device may send the paging signaling to at least one of the first base station and the neighboring base station.

For example, the at least one neighboring base station of the first base station may include multiple neighboring base stations, the core network device may send the paging signaling to at least one of the first base station and the multiple neighboring base stations.

Figure 8:
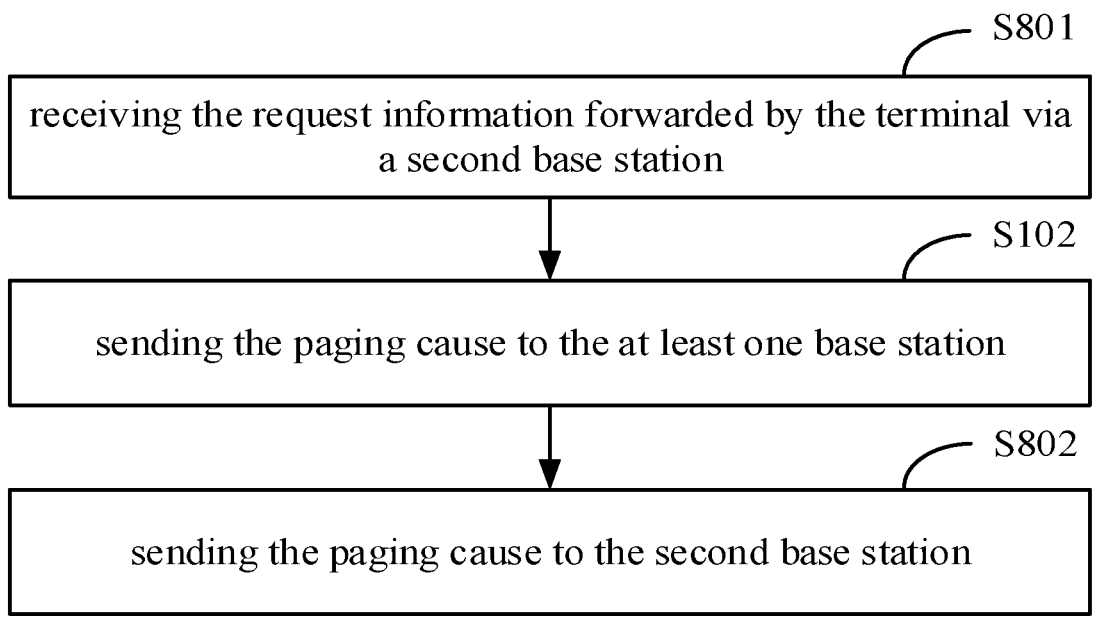
FIG. 8 is a flowchart of another method for indicating a paging cause according to an embodiment of the present disclosure.

FIG. 8 is a flowchart of a method for indicating a paging cause according to the embodiment of the disclosure. As shown in FIG. 8, receiving the request information from the terminal includes the following steps.

At step S801, the request information sent by the terminal via the second base station is received.

The method further includes the following step.

At step S802, the paging cause is sent to the second base station.

In an embodiment, the terminal may send the request information to the core network device by the second base station. The core network device receives the request information sent by the second base station and sends the paging cause to the second base station. Accordingly, the terminal does not carry the information of the second base station in the request information, and the core network device can determine to send the paging cause to the second base station.

It is noted that the embodiment shown in FIG. 8 and the embodiment shown in FIG. 2 may be executed in parallel. In an embodiment, the request information sent by the terminal to the core network device may carry the information of the first base station that sends the paging signaling to the terminal, so that the core network device can determine which base station to send the paging cause to, based on the information of the base station carried in the request information in accordance with the embodiment shown in FIG. 2. In another embodiment, the request information sent by the terminal to the core network device may carry the information of the second base station that sends the request information to the core network device, and it is understood that the information carried here may be the information of the second base station itself carried when forwarding the signaling, so that the core network device may send the paging cause to the base station that sends the request information in accordance with the embodiment shown in FIG. 8. Either or both of the two embodiments can be performed.

In an embodiment, sending the request information by the terminal to the core network device may include: sending the request information to the core network device via the NAS signaling. For example, the request information may be carried in a signaling such as a registration request signaling, a service request signaling, or a mobility registration update signaling. For the NAS signaling, the second base station may forward the signaling carrying the request information directly to the core network device by means of radio transmission.

In an embodiment, sending the request information by the terminal to the core network device may include: sending the request information to the base station via an access stratum signaling, so that the base station sends the request information to the core network device. For example, the request signaling may be carried in a UEAssistanceInformation signaling. For the access stratum signaling, the second base station may parse the signaling to obtain the request information, and then send the request information to the core network device.

Optionally, the core network device not only sends the paging cause to the second base station, but also sends the indication information to the second base station for instructing the second base station to send the paging cause to the terminal. Optionally, the indication information may include the identity information of the terminal, and the second base station may then send the paging cause to the terminal corresponding to the identity information. The method of sending the indication information by the core network device refers to the above mentioned embodiments and will not be described here.

Optionally, the method further includes: sending the paging signaling to the at least one base station.

In an embodiment, the paging signaling may be a paging signaling sent by the core network device to the terminal before receiving the request information sent by the terminal, and the paging signaling sent to the terminal may not carry the paging cause. Therefore, the terminal, after receiving the paging signaling, sends the paging cause for requesting the paging signaling to the core network device.

Alternatively, the paging signaling may be a paging signaling sent by the core network device when sending the paging cause, e.g., the core network device may send the paging signaling, and the paging signaling carries the paging cause. Optionally, the core network device may send the paging signaling to the at least one base station. For example, the core network device may send the paging signaling to at least one of the first base station, the second base station, and the neighboring base station of the first base station.

In an embodiment, the first base station and the second base station may be the same base station or different base stations.

For example, after receiving the request information, the core network device may determine a source of the request information (i.e., the second base station), identify the second base station as the first base station specified by the terminal, and send the paging cause to the first base station. Obviously, the first base station and the second base station are the same base station.

Alternatively, after receiving the request information, the core network device may firstly determine the first base station specified by the terminal based on the request information, determine the source of the request information (i.e., the second base station), and then send the paging cause to the first base station and the second base station, respectively. Optionally, the first base station and the second base station may be the same base station or may be different base stations.

Figure 9:
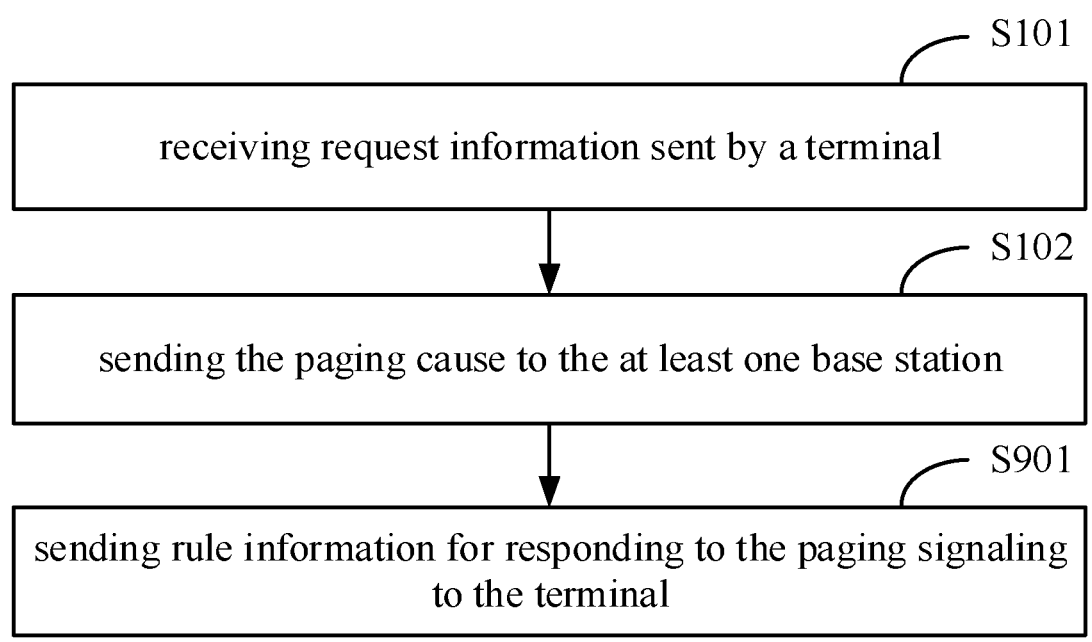
FIG. 9 is a flowchart of another method for indicating a paging cause according to an embodiment of the present disclosure.

FIG. 9 is a flowchart of another method for indicating a paging cause according to an embodiment of the present disclosure.

As shown in FIG. 9, the method further includes the following step.

At step S901, rule information for responding to the paging signaling is sent to the terminal.

The rule information indicates the terminal, in response to a communication conflict between a communication operation of a first SIM card in the terminal and an operation of a second SIM card in the terminal for responding the paging signaling, to resolve the communication conflict based on the rule information.

In an embodiment, the core network device not only sends the paging cause for the paging signaling to the terminal, but also sends the rule information for responding the paging signaling to the terminal. Optionally, the core network device may carry the rule information along with the signaling that sends the paging cause, or, the core network device may carry the rule information via other signaling.

In an embodiment, the core network device may send the rule information to the terminal via at least one of the first base station, the second base station, and the at least one neighboring base station.

For example, for the first base station, the second base station, and the at least one neighboring base station, the core network device may select at least one base station from more than one base station, and send the rule information to the terminal via the selected at least one base station.

In an embodiment, after receiving the rule information, the terminal may resolve the communication conflict based on the rule information, in response to the communication conflict between the communication operation of the first SIM card and the operation of the second SIM card in the terminal for responding to the paging signaling.

In an embodiment, the terminal may send the request information to the core network device in response to the communication conflict between the communication operation of the first SIM card and the operation of the second SIM card for responding to the paging signaling. Upon receiving the rule information, the terminal may resolve the communication conflict in accordance with the rule information.

The rule information sent by the core network device may include various forms, thus the terminal resolves the communication conflict in different ways. Two specific examples of implementation are described below.

In implementation 1, the rule information includes resolving the communication conflict based on a relation between a first priority of a traffic corresponding to the paging cause and a second priority of a traffic corresponding to the communication operation.

Firstly, the terminal may determine the traffic corresponding to the paging signaling based on the received paging cause.

The terminal may determine the first priority of the traffic corresponding to the paging signaling and the second priority of the traffic corresponding to the communication operation based on the rule information.

In an embodiment, the rule information may include a correspondence between traffics and priorities, and the terminal may determine the first priority of the traffic corresponding to the paging signaling, and the second priority of the traffic corresponding to the communication operation, respectively.

The terminal may resolve the communication conflict based on the relation between the first priority and the second priority.

In an embodiment, the terminal may compare the first priority with the second priority and then resolve the communication conflict based on the relation between the two priorities.

For example, in response to the first priority being higher than the second priority, the terminal may respond to the paging signaling by the second SIM card, and suspend a communication operation by the first SIM card. In response to the first priority being lower than the second priority, the terminal may continue the communication operation by the first SIM card and ignore the paging received by the second SIM card. In response to the first priority being equal to the second priority, the terminal may choose to continue the communication operation by the first SIM card or respond to the paging signaling by the second SIM card according to an actual situation.

Up to this point, the introduction of implementation 1 is completed.

In implementation 2, the rule information includes resolving the communication conflict based on a relation between a current quality of service of the traffic corresponding to the communication operation and a minimum quality of service of the traffic corresponding to the communication operation.

Firstly, the terminal determines the current quality of service of the traffic corresponding to the communication operation performed by the first SIM card, and then determines the minimum quality of service of the traffic.

The terminal may resolve the communication conflict based on the relation between the current quality of service and the minimum quality of service.

For example, in response to the current quality of service being much higher than the minimum quality of service, the terminal may respond to the paging signaling by the second SIM card and suspend the communication operation by the first SIM card. After responding to the paging signaling is completed, the terminal continues the communication operation by the first SIM card. In response to the current quality of service being not higher than the minimum quality of service, the terminal may continue the communication operation via the first SIM card and ignore the paging received by the second SIM card.

Up to this point, the introduction of implementation 2 is completed.

It should be noted that the above implementation is only an illustrative description, and in practical applications, the rule information can also be in other forms, and the terminal can also resolve the communication conflict according to the corresponding method, which will not be repeated here.

Figure 10:
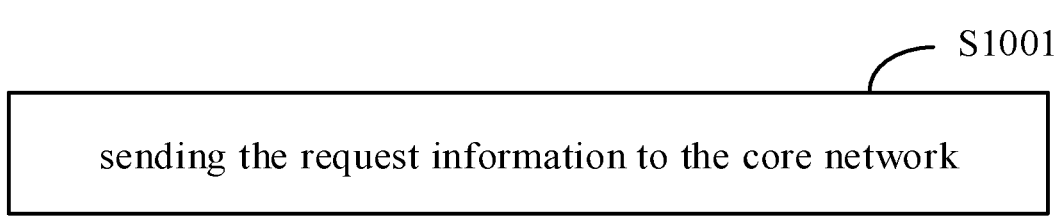
FIG. 10 is a flowchart of a method for requesting a paging cause according to an embodiment of the present disclosure.

FIG. 10 is a flowchart of a method for requesting a paging cause according to an embodiment of the disclosure. The method for requesting the paging cause shown in this embodiment may be performed by a terminal. The terminal may include, but is not limited to, electronic devices such as a cell phone, a tablet computer, a wearable device, a sensor, and an IoT device. The terminal as a user equipment may communicate with a base station and a core network device. The base station may include, but is not limited to, a 4G base station, a 5G base station, and a 6G base station. The core network device may include, but is not limited to, a 4G core network device, a 5G core network device, and a 6G core network device. In an embodiment, the core network device may be a core network device to which a method for indicating a paging cause described in any of the above embodiments is applied.

As shown in FIG. 10, the method for requesting the paging cause may include the following step.

At step S1001, request information is sent to a core network device.

The request information includes information of at least one base station and the request information requests the core network device to send a paging cause for a paging signaling to the at least one base station.

In an embodiment, the terminal may send the request information to the core network device. After receiving the request information sent by the terminal, the core network device may send the paging cause to at least one of base stations indicated by the request information.

According to the embodiment shown in FIG. 10, when the terminal is to be obtained the paging cause, the terminal actively sends the request information to the core network device and specifies the at least one base station in the request information, so that the core network device may send the paging cause to the at least one base station after receiving the request information sent by the terminal. On the one hand, the core network device sends the paging cause again based on the request without sending the paging cause together with the paging signaling. On the other hand, the core network device can send the paging cause to at least one of the base stations indicated by the request information based on the request information, without sending the paging cause to all the base stations in the TA. Therefore, the disclosure may improve relevance of the paging signaling, avoid unnecessarily sending the paging cause by the core network device, and avoid waste of the signaling.

Figure 11:
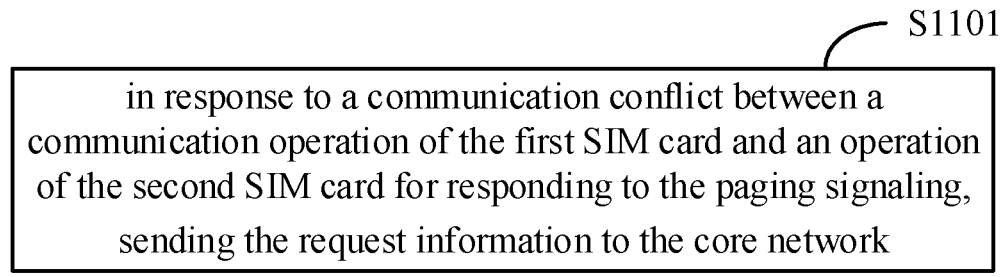
FIG. 11 is a flowchart of another method for requesting a paging cause according to an embodiment of the present disclosure.

FIG. 11 is a flowchart of another method for requesting a paging cause according to an embodiment of the disclosure. In an embodiment, the terminal is configured with at least a first SIM card and a second SIM card.

As shown in FIG. 11, sending the request information to the core network device includes the following step.

At step S1101, in response to a communication conflict between a communication operation of the first SIM card and an operation of the second SIM card for responding to the paging signaling, the request information is sent to the core network device.

The terminal is configured with at least the first SIM card and the second SIM card, which may be considered that the terminal is a multi-card terminal. For example, the terminal may selectively implement multi-card multi-standby, multi-card multi-standby single-pass, or multi-card multi-standby multi-pass, and so on. More than one SIM card may access a same operator network or different operator networks, which can be set as required.

In an embodiment, the terminal receives the paging signaling by the second SIM card while performing the communication operation by the first SIM card, and determines whether to respond to the paging signaling accordingly. In this case, the terminal may determine that the communication conflict between the communication operation and the operation for responding to the paging signaling is existed, and send the request information to the core network device to resolve this communication conflict.

Optionally, the terminal may determine whether to send the request information to the core network device according to a preset method, rather than sending the request information to the core network device in all cases of communication conflicts. Three common determining methods are described illustratively below in combination with the implements 3-5.

In implement 3, the terminal determines whether to send the request information to the core network device based on a type of communication conflict.

In an embodiment, in response to the communication conflict between the communication operation of the first SIM card and the operation of the second SIM card for responding to the paging signaling, sending the request information to the core network device includes: in response to the communication conflict between the communication operation of the first SIM card and the operation of the second SIM card for responding to the paging signaling, and a type of the communication conflict being a target type, sending the request information to the core network device.

In an embodiment, the terminal may preconfigure various types of communication conflicts in a local memory, such as preconfiguring the target type as "conflict between voice call types", or "conflict between voice call types and web browsing types". In response to the type of the communication conflict between the communication operation of the first SIM card and the operation of the second SIM card for responding to the paging signaling is the preset target type stored in the local memory, the terminal may send the request information to the core network device.

In implement 4, the terminal determines whether to send the request information to the core network device based on a number of communication conflicts.

In an embodiment, in response to the communication conflict between the communication operation of the first SIM card and the operation of the second SIM card for responding to the paging signaling, sending the request information to the core network device, includes: in response to the communication conflict between the communication operation of the first SIM card and the operation of the second SIM card for responding to the paging signaling, and the number of communication conflicts being greater than or equal to a target number, sending the request information to the core network device.

In an embodiment, the terminal may preset a number threshold, such as 2 or 5, and then determines the number of communication conflicts. In response to the number of communication conflicts being greater than or equal to the target number, the terminal sends the request information to the core network device.

In implement 5, the terminal determines whether to send the request information to the core network device based on whether the terminal is capable of resolving the communication conflict by itself.

In an embodiment, in response to the communication conflict between the communication operation of the first SIM card and the operation of the second SIM card for responding to the paging signaling, sending the request information to the core network device, includes: in response to the communication conflict between the communication operation of the first SIM card and the operation of the second SIM card for responding to the paging signaling and the terminal failing to resolve the communication conflict, sending the request information to the core network device.

In an embodiment, after determining that the communication conflict is occurred, the terminal may resolve this communication conflict according to the preset rule information stored in the local memory. For example, the local memory of the terminal may be stored with preset priorities of some traffics, the terminal may query the priority of the traffic corresponding to the communication operation of the first SIM card from the local memory. In response to the priority being a highest priority, the terminal may continue to execute the communication operation of the first SIM card and ignore the paging signaling received by the second SIM card. Alternatively, the terminal may resolve this communication conflict by other ways, such as determining the quality of service of the communication operation of the first SIM card.

In response to the terminal failing to resolve the communication conflict by itself, the terminal may send the request information to the core network device.

To this point, the descriptions of implements 3-5 are completed. It should be noted that the above embodiments are illustrative descriptions, and in practical applications, the terminal may determine whether to send the request information to the core network device according to actual demands, which will not be repeated here.

In an embodiment, sending the request information to the core network device by the terminal includes: sending the request information to the core network device via at least one of the first SIM card and the second SIM card in the terminal.

Figure 12:
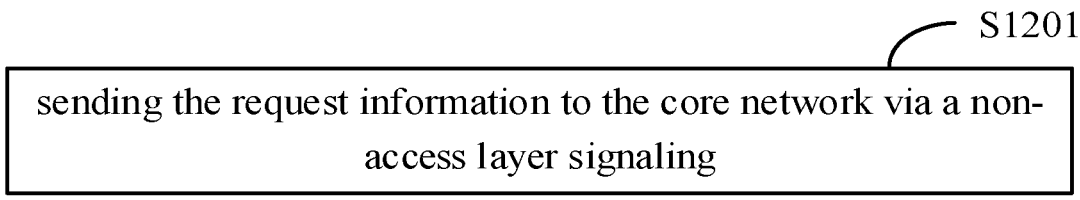
FIG. 12 is a flowchart of another method for requesting a paging cause according to an embodiment of the present disclosure.

FIG. 12 is a flowchart of another method for requesting a paging cause according to an embodiment of the disclosure.

As shown in FIG. 12, sending the request information to the core network device includes the following step.

At step S1201, the request information is sent to the core network device via a NAS signaling.

In an embodiment, the terminal sends the request information to the core network device via the NAS signaling. For example, the terminal may carry the request information in the NAS signaling, such as a registration request signaling, a service request signaling, or a mobility registration update signaling, and then send the signaling to the core network device.

When receiving the NAS signaling, a base station may forward the signaling directly to the core network device by means of radio transmission.

Figure 13:
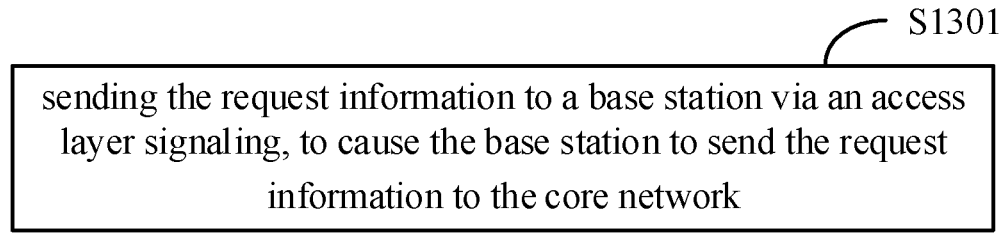
FIG. 13 is a flowchart of another method for requesting a paging cause according to an embodiment of the present disclosure.

FIG. 13 is a flowchart of another method for requesting a paging cause according to an embodiment of the disclosure.

As shown in FIG. 13, sending the request information to the core network device includes the following step.

At step S1301, the request information is sent to a base station via an access stratum signaling, to cause the base station to send the request information to the core network device.

In an embodiment, the terminal sends the request information to the base station via the access stratum signaling. For example, the terminal may carry the request signaling in a UEAssistanceInformation signaling and then send the signaling to the base station.

After receiving the access stratum signaling, the base station may parse the signaling to obtain the request information and then send the request information to the core network device.

Figure 14:
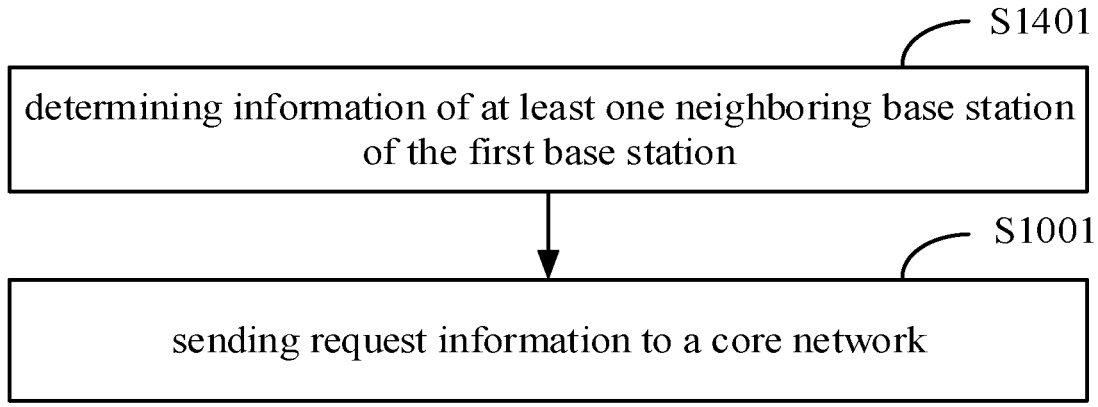
FIG. 14 is a flowchart of another method for requesting a paging cause according to an embodiment of the present disclosure.

FIG. 14 is a flowchart of another method for requesting a paging cause according to an embodiment of the disclosure.

As shown in FIG. 14, the at least one base station includes a first base station, and the method further includes the following step.

At step S1401, information of at least one neighboring base station of the first base station is determined.

In the request information of step S1001, the request information further includes the information of the at least one neighboring base station, and the request information further indicates the core network device to send the paging cause to the at least one neighboring base station.

In an embodiment, the at least one base station in the request information includes a first base station.

Optionally, the first base station may be a base station that sends the paging signal to the terminal. After receiving the paging signaling, the terminal determines the base station that sends the paging signaling, and then carries information of the base station in the request information sent to the core network device.

Alternatively, the first base station may be a base station that sends the request information to the core network device. Before sending the request information to the core network device, the terminal may determine which base station to send the request information to the core network device and carry the information of the determined base station in the request information.

In an embodiment, the terminal may firstly determine the information of the at least one neighboring base station of the first base station, and then carry the information of the neighboring base station in the request information sent to the core network device. After receiving the request information, the core network device may determine the information of the neighboring base station carried in the request information and then send the paging cause to the at least one neighboring base station.

In an embodiment, determining the information of the at least one neighboring base station of the first base station includes: determining the information of the at least one neighboring base station with signal strength greater than a strength threshold from neighboring base stations of the first base station.

In an embodiment, the terminal may firstly determine the strength threshold based on configuration information sent by the core network device or the base station, obtain the neighboring base stations of the first base station, and determine each signal strength for communication with each neighboring base station. The terminal may carry the information of the neighboring base station with signal strength greater than the strength threshold in the request information based on a comparison result of the signal strength of each neighboring base station and the strength threshold. The specific method for determining the neighboring base station by the terminal to can be seen in the embodiment shown in FIG. 3 and is not repeated here.

Figure 15:
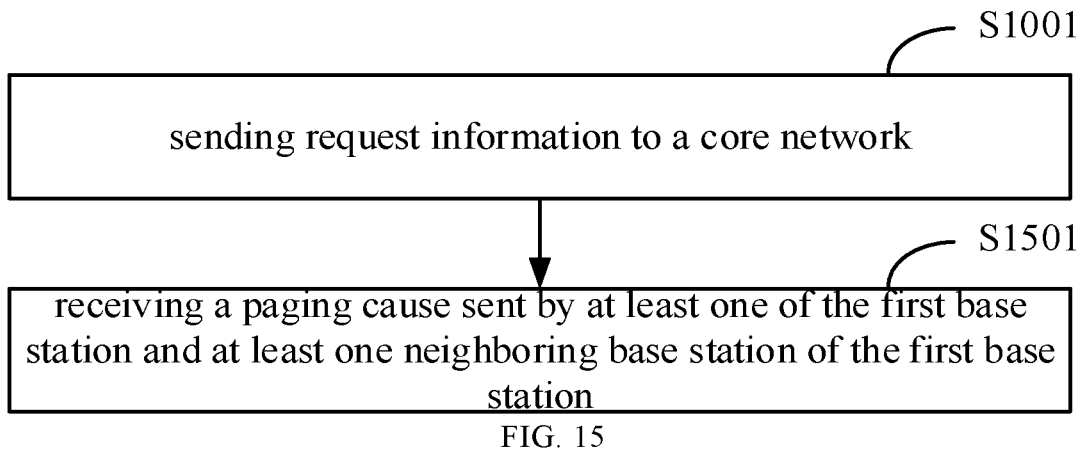
FIG. 15 is a flowchart of another method for requesting a paging cause according to an embodiment of the present disclosure.

FIG. 15 is a flowchart of another method for requesting a paging cause according to an embodiment of the disclosure.

As shown in FIG. 15, the method further includes the following step.

At step S1501, a paging cause sent by at least one of the first base station and at least one neighboring base station of the first base station is received.

In an embodiment, after receiving the request information sent by the terminal, the core network device may send the paging cause to at least one of the first base station and the at least one neighboring base station of the first base station. At least one of the first base station and the at least one neighboring base station may send the paging cause to the terminal.

Figure 16:
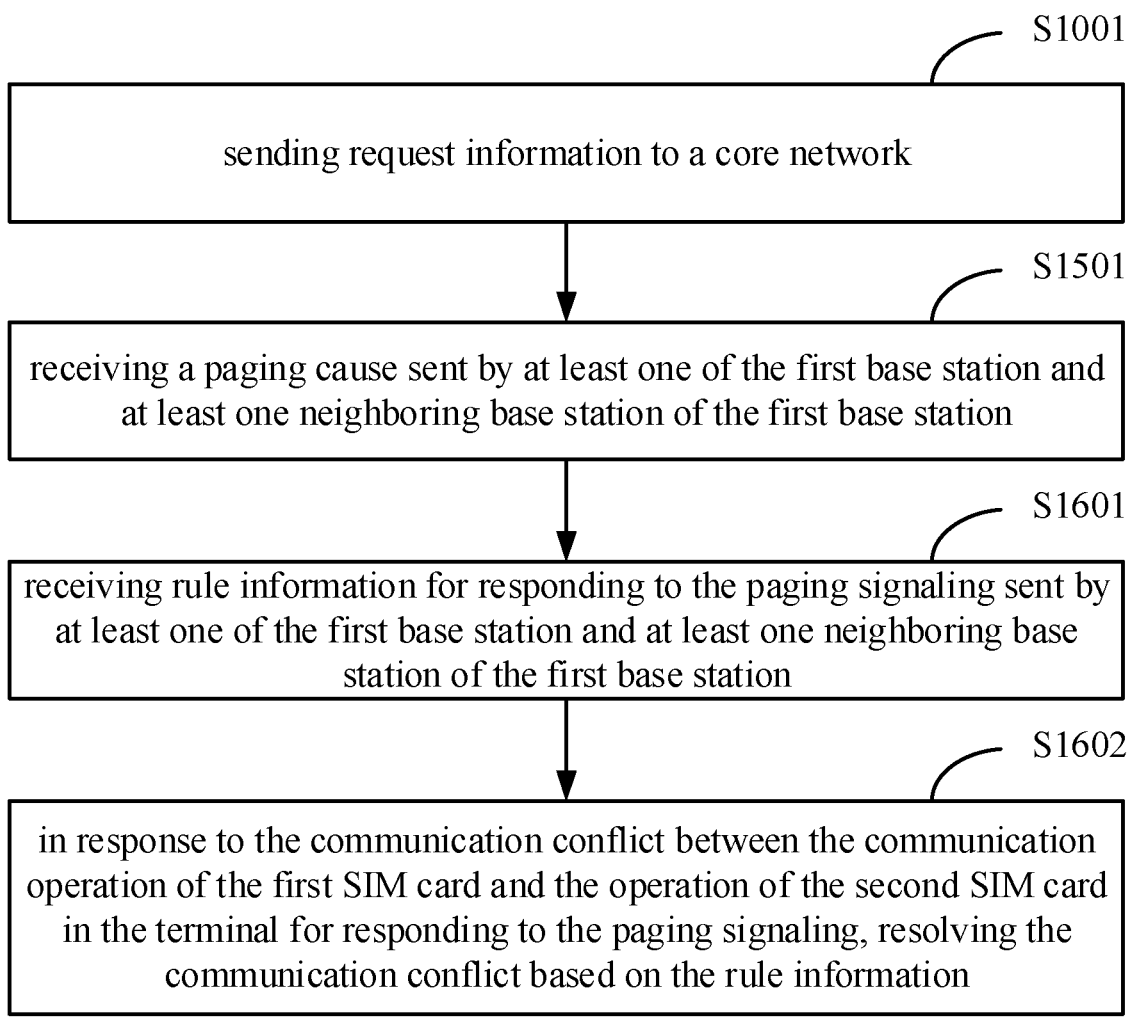
FIG. 16 is a flowchart of another method for requesting a paging cause according to an embodiment of the present disclosure.

FIG. 16 is a flowchart of another method for requesting a paging cause according to an embodiment of the disclosure.

As shown in FIG. 16, the method further includes the following steps.

At step S1601, rule information for responding to the paging signaling sent by at least one of the first base station and the at least one neighboring base station of the first base station is received.

In an embodiment, the core network device may send the rule information for responding to the paging signaling to the terminal. Optionally, the core network device may send the rule information by at least one of the first base station and the at least one of the neighboring base stations of the first base station. The terminal may receive the rule information sent by at least one of the first base station and the at least one neighboring base station of the first base station.

At step S1602, in response to the communication conflict between the communication operation of the first SIM card and the operation of the second SIM card in the terminal for responding to the paging signaling, the communication conflict is resolved based on the rule information.

In an embodiment, after receiving the rule information, the terminal may resolve the communication conflict according to the rule information in response to the communication conflict between the communication operation of the first SIM card and the operation of the second SIM card in the terminal for responding to the paging signaling can be d.

The rule information sent by the core network device may be in various forms, and thus the methods of resolving the communication conflict by the terminal are different.

In an embodiment, resolving the communication conflict based on the rule information includes:
  determining a traffic corresponding to the paging signaling based on the paging cause;
  determining, based on the rule information, a first priority of the traffic corresponding to the paging signaling and a second priority of a traffic corresponding to the communication operation; and
  resolving the communication conflict based on a relation between the first priority and the second priority.

In an embodiment, resolving the communication conflict based on the rule information includes:
  resolving the communication conflict based on a relation between a current quality of service of a traffic corresponding to the communication operation and a minimum quality of service of the traffic corresponding to the communication operation.

The implementation of the above embodiments may refer to the embodiments 1 and 2 of the method for indicating the paging cause, which will not be repeated herein.

Corresponding to the embodiment of the method for indicating the paging cause described above, the disclosure also provides an embodiment of an apparatus for indicating a paging cause.

Figure 17:
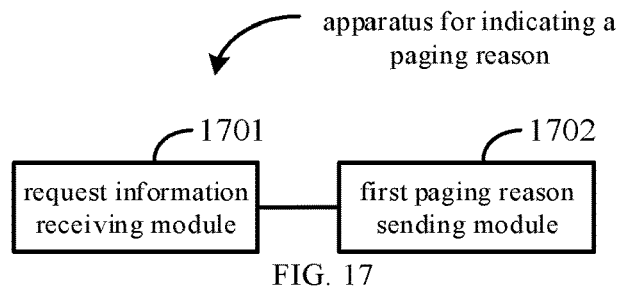
FIG. 17 is a block diagram of an apparatus for indicating a paging cause according to an embodiment of the present disclosure.

FIG. 17 is a block diagram of an apparatus for indicating a paging cause according to an embodiment of the disclosure. The apparatus is applied to a core network device. The core network device may include, but is not limited to, a 4G core network device, a 5G core network device, and a 6G core network device. The core network device may communicate with a terminal as a user equipment. The terminal may include, but is not limited to, electronic devices such as a cell phone, a tablet computer, a wearable device, a sensor, and an IoT device. In an embodiment, the terminal may be a terminal to which an apparatus for requesting a paging cause described in any of the subsequent embodiments is applied.

As shown in FIG. 17, the apparatus further includes: a request information receiving module 1701 and a first paging cause sending module 1702.

The request information receiving module 1701 is configured to receive request information sent by a terminal. The request information requests the core network device to send a paging cause for a paging signaling to at least one base station.

The first paging cause sending module 1702 is configured to send the paging cause to the at least one base station.

Optionally, the apparatus further includes the following modules.

Figure 18:
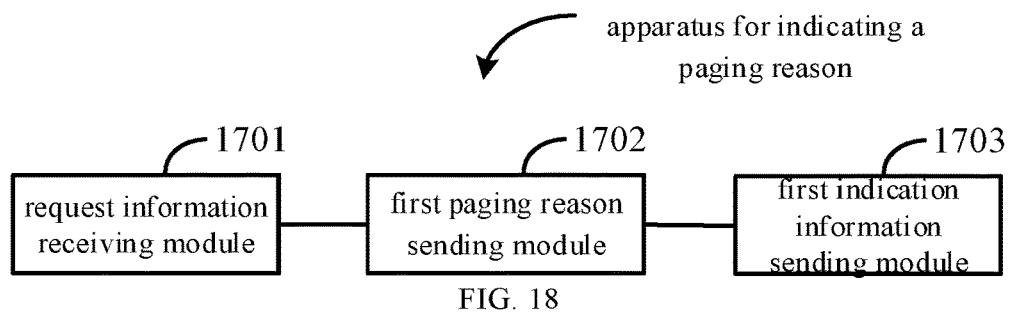
FIG. 18 is a block diagram of another apparatus for indicating a paging cause according to an embodiment of the present disclosure.

FIG. 18 is a block diagram of another apparatus for indicating a paging cause according to an embodiment of the disclosure. As shown in FIG. 18, the apparatus further includes a first indication information sending module 1703.

The first indication information sending module 1703 is configured to send indication information to the at least one base station, in which the indication information indicates the at least one base station to send the paging cause to the terminal.

Optionally, the at least one base station includes a first base station for sending the paging signaling to the terminal.

The request information includes information of the first base station.

Figure 19:
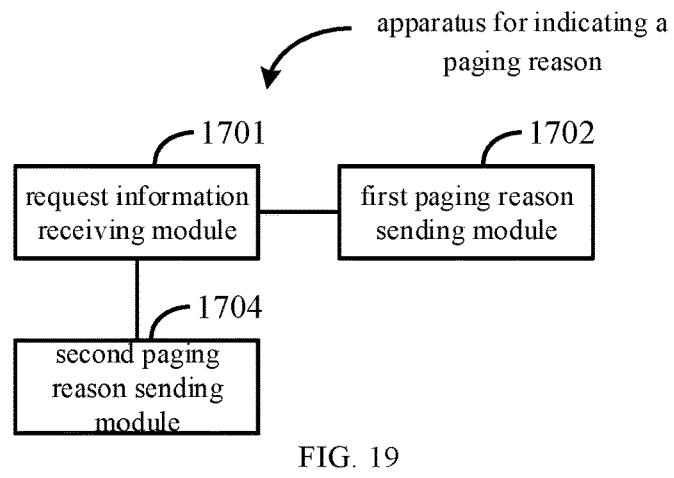
FIG. 19 is a block diagram of another apparatus for indicating a paging cause according to an embodiment of the present disclosure.

FIG. 19 is a block diagram of another apparatus for indicating a paging cause according to an embodiment of the disclosure. As shown in FIG. 19, the request information further includes information of at least one neighboring base station of the first base station. The apparatus further includes a second paging cause sending module 1704.

The second paging cause sending module 1704 is configured to send the paging cause to the at least one neighboring base station.

Figure 20:
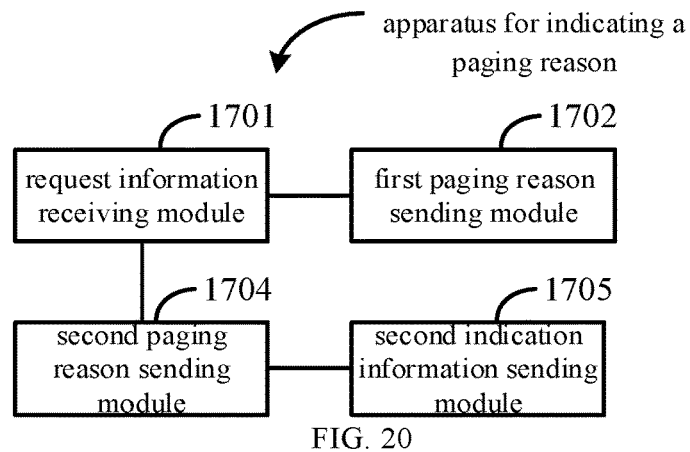
FIG. 20 is a block diagram of another apparatus for indicating a paging cause according to an embodiment of the present disclosure.

FIG. 20 is a block diagram of another apparatus for indicating a paging cause according to an embodiment of the disclosure. As shown in FIG. 20, the apparatus further includes a second indication information sending module 1705.

The second indication information sending module 1705 is configured to send indication information to the at least one neighboring base station, in which the indication information indicates the at least one neighboring base station to send the paging cause to the terminal.

Optionally, sending the paging cause to the at least one neighboring base station includes:
  determining location information of the terminal based on the information of the at least one neighboring base station;

determining a first neighboring base station from the at least one neighboring base station based on the location information; and
sending the paging cause to the first neighboring base station.
Optionally, sending the paging cause to the at least one neighboring base station includes:
determining a second neighboring base station signal strength greater than a threshold value from the at least one neighboring base station; and
sending the paging cause to the second neighboring base station.

Figure 21:
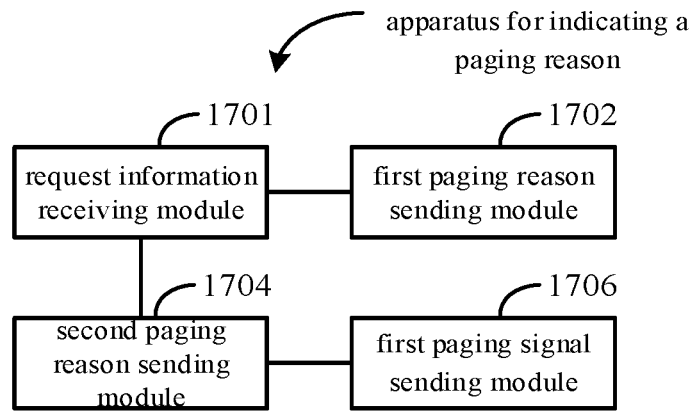
FIG. 21 is a block diagram of another apparatus for indicating a paging cause according an embodiment of the present disclosure.

FIG. 21 is a block diagram of another apparatus for indicating a paging cause according to an embodiment of the disclosure. As shown in FIG. 21, the apparatus further includes a first paging signaling sending module 1706.

The first paging signaling sending module 1706 is configured to send the paging signaling to at least one of the first base station and the at least one neighboring base station.

Figure 22:
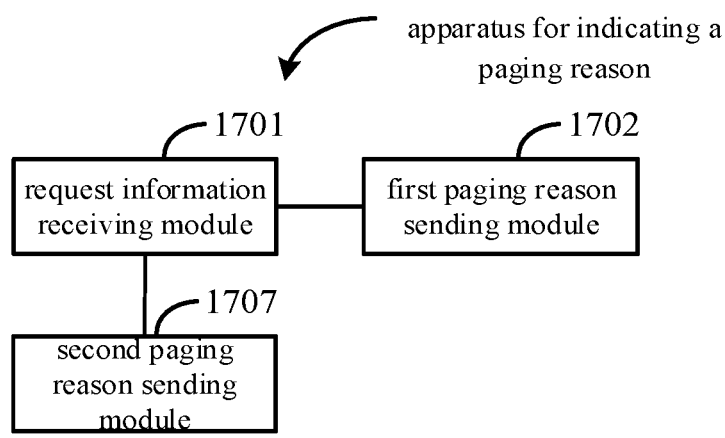
FIG. 22 is a block diagram of another apparatus for indicating a paging cause according to an embodiment of the present disclosure.

FIG. 22 is a block diagram of another apparatus for indicating a paging cause according to an embodiment of the disclosure.

As shown in FIG. 22, the at least one base station includes a second base station.

Receiving the request information sent by the terminal includes: receiving the request information sent by the terminal via the second base station. The apparatus further includes: a third paging cause sending module 1707.

The third paging cause sending module 1707 is configured to send the paging cause to the second base station.

Figure 23:
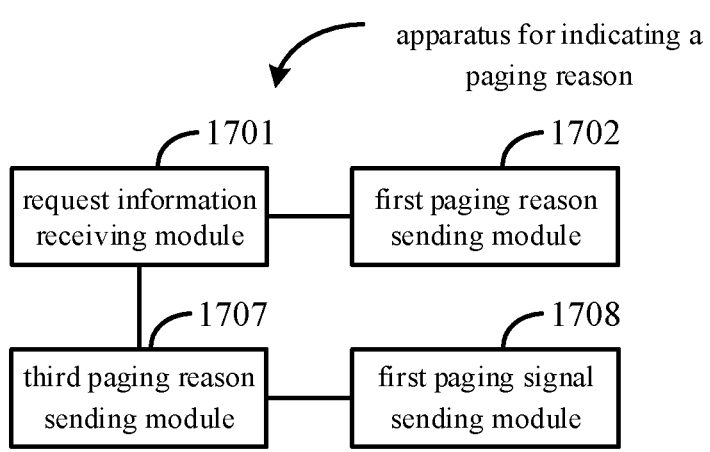
FIG. 23 is a block diagram of another apparatus for indicating a paging cause according to an embodiment of the present disclosure.

FIG. 23 is a block diagram of another apparatus for indicating a paging cause according to an embodiment of the disclosure. As shown in FIG. 23, the apparatus further includes a second paging signaling sending module 1708.

The second paging signaling sending module 1708 is configured to send the paging signaling to the at least one base station.

Figure 24:
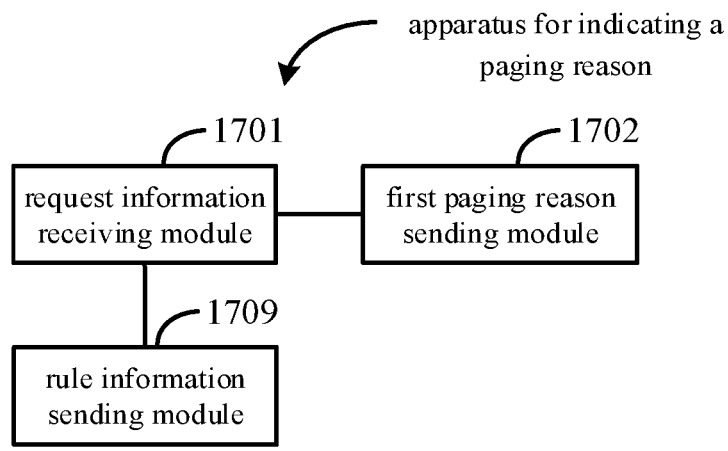
FIG. 24 is a block diagram of another apparatus for indicating a paging cause according to an embodiment of the present disclosure.

FIG. 24 is a block diagram of another apparatus for indicating a paging cause according to an embodiment of the disclosure. As shown in FIG. 24, the apparatus further includes a rule information sending module 1709.

The rule information sending module 1709 is configured to send rule information for responding to the paging signaling to the terminal, in which the rule information indicates the terminal, in response to a communication conflict between a communication operation of a first SIM card in the terminal and an operation of a second SIM card in the terminal for responding to the paging signaling, to resolve the communication conflict based on the rule information.

Optionally, the rule information includes resolving the communication conflict based on a relation between a first priority of a traffic corresponding to the paging cause and a second priority of a traffic corresponding to the communication operation.

Optionally, the rule information includes resolving the communication conflict based on a relation between a current quality of service of a traffic corresponding to the communication operation and a minimum quality of service of a traffic corresponding to the communication operation.

Corresponding to the above embodiments of the method for requesting the paging cause, the disclosure also provides embodiments of an apparatus for requesting a paging cause.

Figure 25:
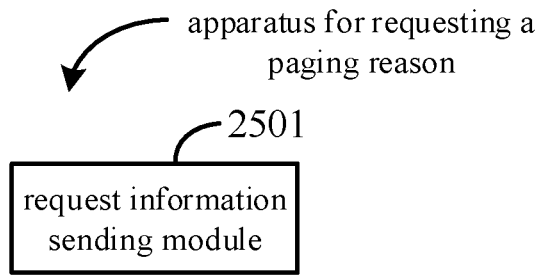
FIG. 25 is a block diagram of an apparatus for requesting a paging cause according to an embodiment of the present disclosure.

FIG. 25 is a block diagram of an apparatus for requesting a paging cause according to an embodiment of the disclosure. The method shown in this embodiment may be applied to a terminal. The terminal may include, but is not limited to, electronic devices such as a cell phone, a tablet computer, a wearable device, a sensor, and an IoT device. The terminal as a user equipment may communicate with a base station and a core network device. The base station may include, but is not limited to, a 4G base station, a 5G base station, and a 6G base station. The core network device may include, but is not limited to, a 4G core network device, a 5G core network device, and a 6G core network device. In an embodiment, the core network device may be a core network device to which a method for indicating a paging cause described in any of the above embodiments is applied.

As shown in FIG. 25, the apparatus for requesting the paging cause includes a request information sending module 2501.

The request information sending module 2501 is configured to send request information to a core network device, in which the request information includes information of at least one base station, and the request information requests the core network device to send a paging cause for a paging signaling to the at least one base station.

Optionally, the terminal is configured with at least a first SIM card and a second SIM card, and sending the request information to the core network device includes:
in response to a communication conflict between a communication operation of the first SIM card and an operation of the second SIM card for responding to the paging signaling, sending the request information to the core network device.

Optionally, in response to the communication conflict between the communication operation of the first SIM card and the operation of the second SIM card for responding to the paging signaling, sending the request information to the core network device, includes:
in response to the communication conflict between the communication operation of the first SIM card and the operation of the second SIM card for responding to the paging signaling and a type of the communication conflict being a target type, sending the request information to the core network device.

Optionally, in response to the communication conflict between the communication operation of the first SIM card and the operation of the second SIM card for responding to the paging signaling, sending the request information to the core network device includes:
in response to the communication conflict between the communication operation of the first SIM card and the operation of the second SIM card for responding to the paging signaling, and a number of communication conflicts being greater than or equal to a target number, sending the request information to the core network device.

Optionally, in response to the communication conflict between the communication operation of the first SIM card and the operation of the second SIM card for responding to the paging signaling, sending the request information to the core network device includes:
in response to the communication conflict between the communication operation of the first SIM card and the operation of the second SIM card for responding to the paging signaling and the terminal failing to resolve the communication conflict, sending the request information to the core network device.

Optionally, sending the request information to the core network device includes:
sending the request information to the core network device via at least one of the first SIM card and the second SIM card in the terminal.

Optionally, sending the request information to the core network device includes:
sending the request information to the core network device via a NAS signaling.

Optionally, sending the request information to the core network device includes:
sending the request information to a base station via an access stratum signaling, to cause the base station to send the request information to the core network device.

Figure 26:
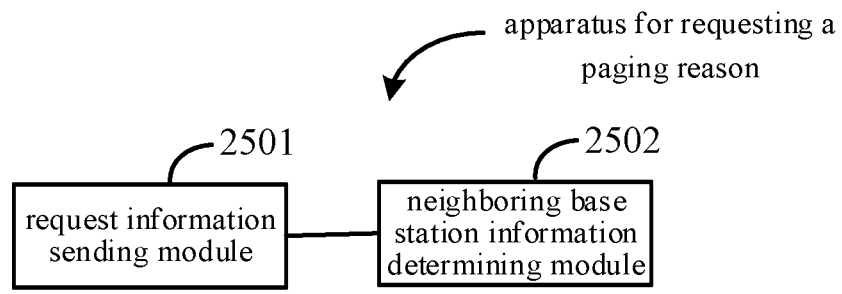
FIG. 26 is a block diagram of another apparatus for requesting a paging cause according to an embodiment of the present disclosure.

FIG. 26 is a block diagram of another apparatus for requesting a paging cause according to an embodiment of the disclosure.

As shown in FIG. 26, the at least one base station includes a first base station, and the apparatus further includes a neighboring base station information determining module 2502 and a request information receiving module 2501.

The neighboring base station information determining module 2502 is configured to determine information of at least one neighboring base station of the first base station.

The request information received by the request information receiving module 2501 further includes the information of the at least one neighboring base station, and the request information further indicates the core network device to send the paging cause to the at least one neighboring base station.

Optionally, determining the information of the at least one neighboring base station of the first base station includes:
determining the information of the at least one neighboring base station with signal strength greater than a strength threshold from neighboring base stations of the first base station.

Figure 27:
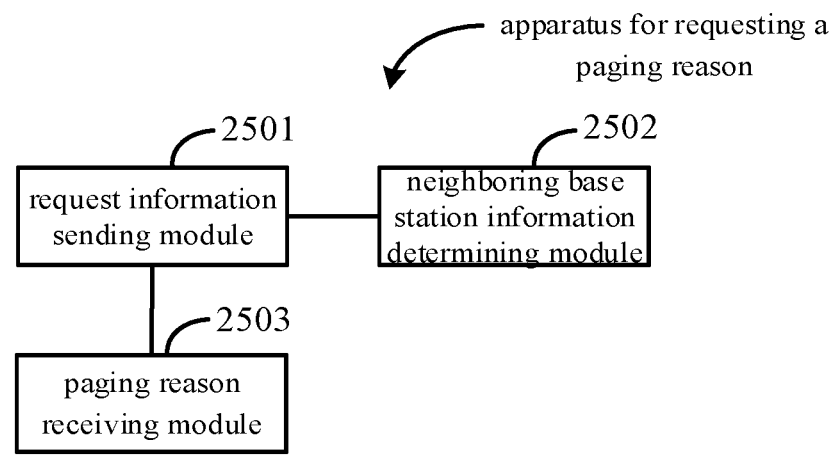
FIG. 27 is a block diagram of another apparatus for requesting a paging cause according to an embodiment of the present disclosure.

FIG. 27 is a block diagram of another apparatus for requesting a paging cause according to an embodiment of the disclosure.

As shown in FIG. 27, the apparatus further includes a paging cause receiving module 2503.

The paging cause receiving module 2503 is configured to receive a paging cause sent by at least one of the first base station and at least one neighboring base station of the first base station.

Figure 28:
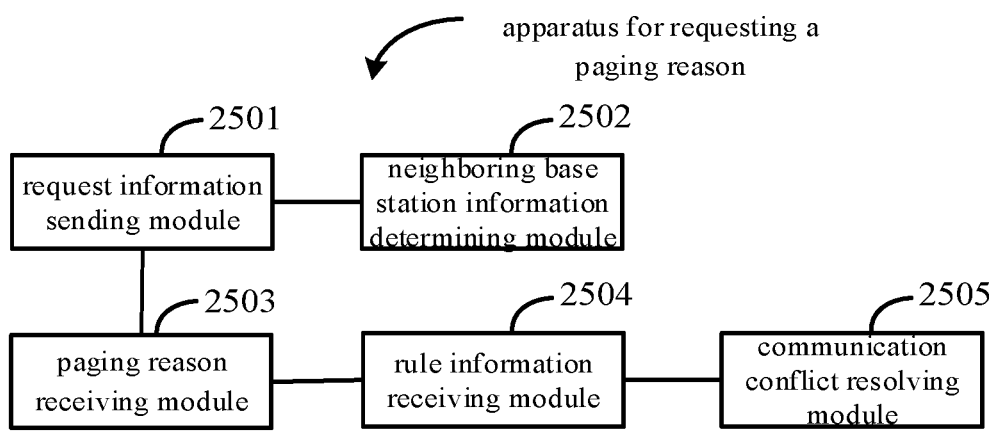
FIG. 28 is a block diagram of another apparatus for requesting a paging cause according to an embodiment of the present disclosure.

FIG. 28 is a block diagram of another apparatus for requesting a paging cause according to an embodiment of the disclosure.

As shown in FIG. 28, the apparatus further includes a rule information receiving module 2504 and a communication conflict resolving module 2505.

The rule information receiving module 2504 is configured to receive rule information for responding to the paging signaling sent by at least one of the first base station and at least one neighboring base station of the first base station.

The communication conflict resolving module 2505 is configured to, in response to the communication conflict between the communication operation of the first SIM card and the operation of the second SIM card in the terminal for responding the paging signaling, resolve the communication conflict based on the rule information.

Optionally, resolving the communication conflict based on the rule information includes:
determining a traffic corresponding to the paging signaling based on the paging cause;
determining, based on the rule information, a first priority of the traffic corresponding to the paging signaling and a second priority of a traffic corresponding to the communication operation; and
resolving the communication conflict based on a relation between the first priority and the second priority.

Optionally, resolving the communication conflict based on the rule information includes:
resolving the communication conflict based on a relation between a current quality of service of a traffic corresponding to the communication operation and a minimum quality of service of the traffic corresponding to the communication operation.

With respect to the apparatus in the above embodiments, the specific way in which each module performs its operation has been described in detail in the embodiments of the relevant method, and will not be described in detail here.

The apparatus embodiments correspond to the method embodiments essentially, it is sufficient to refer to the method embodiments for the relevant part of the description. The apparatus embodiments described above are merely schematic, the modules described as separate components may or may not be physically separated, and the components shown as modules may or may not be physical modules, i.e., they may be located in one place or may be distributed to multiple network modules. Some or all of these modules can be selected according to practical needs to achieve the purpose of the embodiment. The solution can be understood and implemented by those skilled in the art without inventive works.

An embodiment of the disclosure also provides an electronic device. The electronic device includes:
a processor;
a memory for storing instructions executable by the processor; in which
the processor is configured to implement the method for indicating the paging cause and/or the method for requesting the paging cause according to any of the embodiments.

The embodiments of the disclosure also provide a computer-readable storage medium having computer programs stored thereon. When the computer programs are executed by a processor, the steps of the method for indicating the paging cause and/or the method for requesting the paging cause described in any of the above embodiments is implemented.

Figure 29:
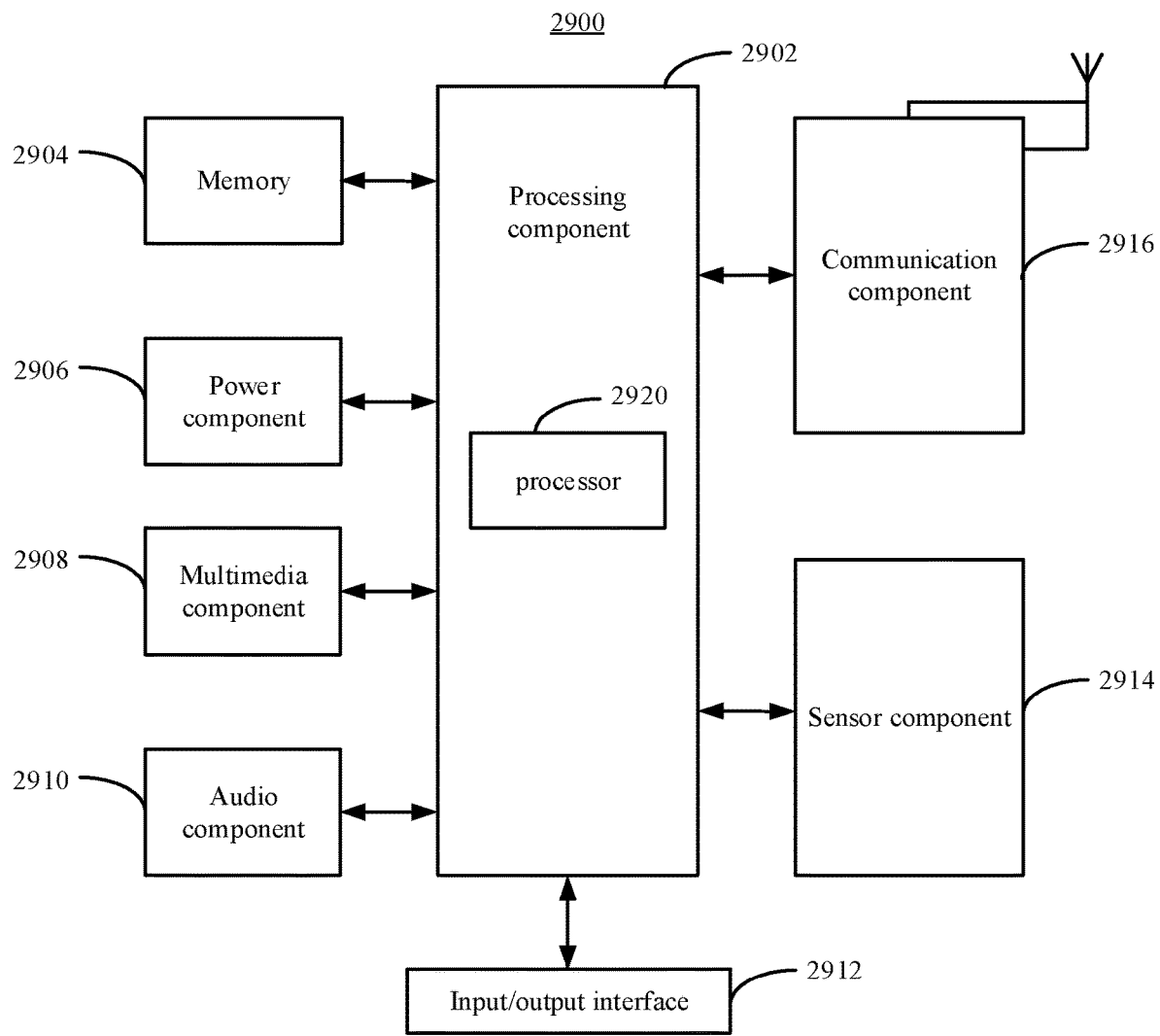
FIG. 29 is a block diagram of a device 2900 for requesting a paging cause according to an embodiment of the present disclosure.

FIG. 29 is a block diagram of a device 2900 for requesting a paging cause according to an embodiment of the disclosure. For example, the device 2900 may be a mobile phone, a computer, a digital broadcasting terminal, a message transceiver device, a game console, a tablet device, a medical device, a fitness device and a personal digital assistant.

As illustrated in FIG. 29, the device 2900 may include one or more of the following components: a processing component 2902, a memory 2904, a power component 2906, a multimedia component 2908, an audio component 2910, an input/output (I/O) interface 2912, a sensor component 2914, and a communication component 2916.

The processing component 2902 typically controls overall operations of the device 2900, such as the operations associated with display, telephone calls, data communications, camera operations, and recording operations. The processing component 2902 may include one or more processors 2920 to perform all or part of the steps in the above described method for requesting the paging cause. Moreover, the processing component 2902 may include one or more modules which facilitate the interaction between the processing component 2902 and other components. For example, the processing component 2902 may include a multimedia module to facilitate the interaction between the multimedia component 2908 and the processing component 2902.

The memory 2904 is configured to store various types of data to support the operation of the device 2900. Examples of such data include instructions for any applications or methods operated on the device 2900, contact data, phonebook data, messages, pictures, video, etc. The memory 2904 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 2906 provides power to various components of the device 2900. The power component 2906 may include a power management system, one or more power sources, and any other components associated with the generation, management, and distribution of power in the device 2900.

The multimedia component 2908 includes a screen providing an output interface between the device 2900 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2908 includes a front-facing camera and/or a rear-facing camera. When the device 2900 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 2910 is configured to output and/or input audio signals. For example, the audio component 2910 includes a microphone (MIC) configured to receive an external audio signal when the device 2900 is in an operation mode, such as a call mode, a recording mode, and a voice recognition mode. The received audio signal may be further stored in the memory 2904 or transmitted via the communication component 2916. In some embodiments, the audio component 2910 further includes a speaker to output audio signals.

The I/O interface 2912 provides an interface between the processing component 2902 and peripheral interface modules, such as a keyboard, a click wheel, buttons, and the like. The buttons may include, but are not limited to, a home button, a volume button, a starting button, and a locking button.

The sensor component 2914 includes one or more sensors to provide status assessments of various aspects of the device 2900. For instance, the sensor component 2914 may detect an open/closed status of the device 2900, relative positioning of components, e.g., the display and the keypad, of the device 2900, a change in position of the device 2900 or a component of the device 2900, a presence or absence of user contact with the device 2900, an orientation or an acceleration/deceleration of the device 2900, and a change in temperature of the device 2900. The sensor component 2914 may include a proximity sensor configured to detect the presence of nearby objects without any physical contact. The sensor component 2914 may also include a light sensor, such as a Complementary Metal Oxide Semiconductor (CMOS) or Charge-coupled Device (CCD) image sensor, for use in imaging applications. In some embodiments, the sensor component 2914 may also include an accelerometer sensor, a gyroscope sensor, a magnetic sensor, a pressure sensor, or a temperature sensor.

The communication component 2916 is configured to facilitate communication, wired or wirelessly, between the device 2900 and other devices. The device 2900 can access a wireless network based on a communication standard, such as Wi-Fi, 2G or 3G, 4G LTE, 5G NR or a combination thereof. In an exemplary embodiment, the communication component 2916 receives a broadcast signal or broadcast associated information from an external broadcast management system via a broadcast channel. In an exemplary embodiment, the communication component 2916 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Blue Tooth (BT) technology, and other technologies.

In exemplary embodiments, the device 2900 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method for requesting a paging cause.

In exemplary embodiments, there is also provided a non-transitory computer readable storage medium including instructions, such as the memory 2904, executable by the processor 2920 in the device 2900, for performing the above method for requesting a paging cause. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It is noted that in this disclosure, relation terms such as "first" and "second" are used only to distinguish one entity or operation from another, without necessarily requiring or implying any such actual relation or order among those entities or operations. The terms "includes", "comprises", or any other variation thereof, is intended to cover non-exclusive inclusion, so that a process, method, article, or device that includes a range of elements includes not only those elements, but also other elements that are not explicitly listed or that are inherent to such process, method, article, or device. Without further limitation, the elements defined by the statement "including a" do not preclude the existence of additional identical elements in the process, method, article or device including the elements.

The methods and devices provided by the embodiments of the disclosure are described in detail above, and specific examples are applied in the disclosure to illustrate the principles and implementations of the disclosure, and the description of the above embodiments is only used to help understand the methods of the disclosure and its core ideas. Meanwhile, for those skilled in the art, according to the ideas of the disclosure, there will be changes in the specific implementations and the scope of application. In conclusion, the contents of the disclosure should not be understood as a limitation of the disclosure.

What is claimed is:

1. A method for indicating a paging cause, performed by a core network device, comprising:
    receiving request information sent by a terminal, wherein the request information requests the core network device to send a paging cause for a paging signaling to at least one base station; and
    sending the paging cause to the at least one base station;
    wherein the at least one base station comprises a first base station for sending the paging signaling to the terminal, and
    the request information comprises information of the first base station.

2. The method of claim 1, further comprising:
    sending indication information to the at least one base station, wherein the indication information indicates to the at least one base station to send the paging cause to the terminal.

3. The method of claim 1, wherein the request information further comprises information of at least one neighboring base station of the first base station, and the method further comprises:
    sending the paging cause to the at least one neighboring base station.

4. The method of claim 3, further comprising:
    sending indication information to the at least one neighboring base station, wherein the indication information indicates to the at least one neighboring base station to send the paging cause to the terminal.

5. The method of claim 3, wherein sending the paging cause to the at least one neighboring base station comprises:
    determining location information of the terminal based on the information of the at least one neighboring base station;
    determining a first neighboring base station from the at least one neighboring base station based on the location information; and
    sending the paging cause to the first neighboring base station; or,
    wherein sending the paging cause to the at least one neighboring base station comprises:
    determining a second neighboring base station with signal strength greater than a threshold value from the at least one neighboring base station; and
    sending the paging cause to the second neighboring base station.

6. The method of claim 1, wherein the at least one base station comprises a second base station;
    receiving the request information sent by the terminal comprises:
    receiving the request information sent by the terminal via the second base station; and
    the method further comprises:
    sending the paging cause to the second base station.

7. The method of claim 1, further comprising:
    sending the paging signaling to the at least one base station.

8. The method of claim 1, further comprising:
    sending rule information for responding to the paging signaling to the terminal; wherein
    the rule information indicates to the terminal, in response to a communication conflict between a communication operation of a first Subscriber Identity Module (SIM) card in the terminal and an operation of a second SIM card in the terminal for responding to the paging signaling, to resolve the communication conflict based on the rule information.

9. The method of claim 8, wherein the rule information comprises resolving the communication conflict based on a relation between a first priority of a traffic corresponding to the paging cause and a second priority of a traffic corresponding to the communication operation; or
    wherein the rule information comprises resolving the communication conflict based on a relation between a current quality of service of a traffic corresponding to the communication operation and a minimum quality of service of a traffic corresponding to the communication operation.

10. A method for requesting a paging cause, performed by a terminal, comprising:
    sending request information to a core network device, wherein the request information comprises information of at least one base station, and the request information requests the core network device to send a paging cause for a paging signaling to the at least one base station;
    wherein the at least one base station comprises a first base station for sending the paging signaling to the terminal, and
    the request information comprises information of the first base station.

11. The method of claim 10, wherein the terminal is configured with at least a first SIM card and a second SIM card, and sending the request information to the core network device comprises:
    in response to a communication conflict between a communication operation of the first SIM card and an operation of the second SIM card for responding to the paging signaling, sending the request information to the core network device.

12. The method of claim 11, wherein in response to the communication conflict between the communication operation of the first SIM card and the operation of the second SIM card for responding to the paging signaling, sending the request information to the core network device comprises:
    in response to the communication conflict between the communication operation of the first SIM card and the operation of the second SIM card for responding to the paging signaling and a type of the communication conflict being a target type, sending the request information to the core network device; or,
    wherein in response to the communication conflict between the communication operation of the first SIM card and the operation of the second SIM card for responding to the paging signaling, sending the request information to the core network device comprises:
    in response to the communication conflict between the communication operation of the first SIM card and the operation of the second SIM card for responding to the paging signaling and a number of communication conflicts being greater than or equal to a target number, sending the request information to the core network device; or, wherein in response to the communication conflict between the communication operation of the first SIM card and the operation of the second SIM card for responding to the paging signaling, sending the request information to the core network device comprises:

in response to the communication conflict between the communication operation of the first SIM card and the operation of the second SIM card for responding to the paging signaling and the terminal failing to resolve the communication conflict, sending the request information to the core network device.

13. The method of claim 10, wherein sending the request information to the core network device comprises:
sending the request information to the core network device via a non-access stratum signaling; or
sending the request information to a base station via an access stratum signaling, to cause the base station to send the request information to the core network device; or
sending the request information to the core network via at least one of a first SIM card and a second SIM card in the terminal.

14. The method of claim 10, wherein the method further comprises:
determining information of at least one neighboring base station of the first base station; wherein
the request information further comprises the information of the at least one neighboring base station, and the request information further indicates to the core network device to send the paging cause to the at least one neighboring base station.

15. The method of claim 14, wherein determining the information of the at least one neighboring base station of the first base station comprises:
determining the information of the at least one neighboring base station with signal strength greater than a strength threshold from neighboring base stations of the first base station.

16. The method of claim 14, further comprising:
receiving rule information for responding to the paging signaling sent by at least one of the first base station and at least one neighboring base station of the first base station; and in response to a communication conflict between the communication operation of the first SIM card and the operation of the second SIM card in the terminal for responding to the paging signaling, resolving the communication conflict based on the rule information.

17. The method of claim 16, wherein resolving the communication conflict based on the rule information comprises:
determining a traffic corresponding to the paging signaling based on the paging cause;
determining, based on the rule information, a first priority of the traffic corresponding to the paging signaling and a second priority of a traffic corresponding to the communication operation; and
resolving the communication conflict based on a relation between the first priority and the second priority; or,
wherein resolving the communication conflict based on the rule information comprises:
resolving the communication conflict based on a relation between a current quality of service of a traffic corresponding to the communication operation and a minimum quality of service of the traffic corresponding to the communication operation.

18. The method of claim 10, wherein the method further comprises:
receiving the paging cause sent by at least one of the first base station and at least one neighboring base station of the first base station.

19. A core network device, comprising:
a processor;
a memory for storing instructions executable by the processor; wherein
the processor is configured to implement:
receiving request information sent by a terminal, wherein the request information requests the core network device to send a paging cause for a paging signaling to at least one base station; and
sending the paging cause to the at least one base station;
wherein the at least one base station comprises a first base station for sending the paging signaling to the terminal, and
the request information comprises information of the first base station.

* * * * *